(12) United States Patent
Kwak et al.

(10) Patent No.: US 11,362,784 B2
(45) Date of Patent: *Jun. 14, 2022

(54) METHOD AND APPARATUS FOR CHANNEL ESTIMATION AND DATA DECODING IN WIRELESS COMMUNICATION SYSTEM

(71) Applicant: Samsung Electronics Co., Ltd., Suwon-si (KR)

(72) Inventors: Youngwoo Kwak, Suwon-si (KR); Younsun Kim, Seongnam-si (KR); Hoondong Noh, Suwon-si (KR); Cheolkyu Shin, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/932,152

(22) Filed: Jul. 17, 2020

(65) Prior Publication Data

US 2020/0351050 A1 Nov. 5, 2020

Related U.S. Application Data

(63) Continuation of application No. 15/821,267, filed on Nov. 22, 2017, now Pat. No. 10,721,038.

(30) Foreign Application Priority Data

Dec. 12, 2016 (KR) .......................... 10-2016-0168921
Jan. 10, 2017 (KR) .......................... 10-2017-0003609

(51) Int. Cl.
*H04L 5/00* (2006.01)
*H04B 7/0417* (2017.01)
(Continued)

(52) U.S. Cl.
CPC ......... *H04L 5/0048* (2013.01); *H04B 7/0417* (2013.01); *H04L 5/0051* (2013.01);
(Continued)

(58) Field of Classification Search
CPC ... H04L 5/0048; H04L 5/0053; H04L 1/0009; H04L 5/0094; H04L 5/0039; H04L 5/001;
(Continued)

(56) References Cited

U.S. PATENT DOCUMENTS 9,008,582 B2 4/2015 Barbieri et al.
9,300,373 B2 * 3/2016 Lindoff ............... H04L 25/0222
(Continued)

FOREIGN PATENT DOCUMENTS

CN 102714566 A 10/2012
CN 104604283 A 5/2015
(Continued)

OTHER PUBLICATIONS

Ericsson, 'On PRB bundling for NR', R1-1612336, 3GPP TSG-RAN WG1 #87, Reno, USA, Nov. 5, 2016.
(Continued)

*Primary Examiner* — Wutchung Chu
(74) *Attorney, Agent, or Firm* — Jefferson IP Law, LLP

(57) ABSTRACT

A communication method and system that combine the internet of things (IoT) technology with fifth generation (5G) communication systems supporting a higher data rate after fourth generation (4G) systems are provided. The present disclosure may be applied to intelligent services, such as smart homes, smart buildings, smart cities, smart or connected cars, healthcare, digital education, retail businesses, and security and safety related services on the basis of 5G communication technologies and IoT related technologies. A method of a terminal in a wireless communication system to improve DMRS channel estimation perfor-
(Continued)

mance is provided. The method includes receiving first information configuring a physical resource block (PRB) bundling size indication based on second information, receiving the second information indicating the number of at least one PRB, if the PRB bundling size indication is configured, and estimating the channel state based on an assumption that the same precoding is applied to the at least one PRB based on the second information.

16 Claims, 22 Drawing Sheets

Related U.S. Application Data

(60) Provisional application No. 62/425,299, filed on Nov. 22, 2016.

(51) Int. Cl.
  *H04L 25/02* (2006.01)
  *H04W 72/04* (2009.01)
  *H04W 72/12* (2009.01)
  *H04W 88/08* (2009.01)

(52) U.S. Cl.
  CPC ........ *H04L 5/0094* (2013.01); *H04L 25/0228* (2013.01); *H04W 72/044* (2013.01); *H04W 72/12* (2013.01); *H04L 5/0023* (2013.01); *H04L 25/0222* (2013.01); *H04W 88/08* (2013.01)

(58) Field of Classification Search
  CPC ....... H04L 5/00; H04L 5/0007; H04L 5/0044; H04L 1/00; H04L 27/2675; H04L 5/005; H04L 1/1864; H04L 5/0057; H04L 5/0051; H04L 1/08; H04L 5/0035; H04L 5/0023; H04L 5/0026; H04L 1/1812; H04L 5/0064; H04L 5/0055; H04L 1/1819; H04L 25/0228; H04L 25/0222; H04W 24/08; H04W 72/044; H04W 72/12; H04W 72/042; H04W 74/006; H04W 16/28; H04W 76/14; H04W 28/20; H04W 72/1289; H04W 72/04; H04W 72/0413; H04W 74/0808; H04W 24/10; H04W 72/02; H04W 72/0406; H04W 52/325; H04W 28/04; H04W 88/08; H04B 7/0482; H04B 7/0456; H04B 17/373; H04B 7/06; H04B 7/024; H04B 7/0626; H04B 7/0695; H04B 7/0404; H04B 7/0417; H04B 7/0408
  See application file for complete search history.

(56) References Cited

U.S. PATENT DOCUMENTS

| | | | | |
|---|---|---|---|---|
| 9,768,926 | B2* | 9/2017 | Seo | H04L 5/0048 |
| 10,103,854 | B2* | 10/2018 | Nakashima | H04L 5/0053 |
| 10,292,143 | B2* | 5/2019 | Chatterjee | H04W 72/0446 |
| 10,333,681 | B2* | 6/2019 | Kwak | H04L 5/0051 |
| 10,349,391 | B2* | 7/2019 | Zhang | H04W 76/27 |
| 10,993,224 | B1* | 4/2021 | Zhang | H04W 72/04 |
| 2011/0170498 | A1 | 7/2011 | Liu et al. | |
| 2011/0255505 | A1* | 10/2011 | Liu | H04L 5/0051 |
| | | | | 370/330 |
| 2013/0114522 | A1* | 5/2013 | Frenne | H04L 5/0094 |
| | | | | 370/329 |
| 2013/0114533 | A1* | 5/2013 | Ji | H04W 72/1263 |
| | | | | 370/329 |
| 2013/0163530 | A1* | 6/2013 | Chen | H04W 72/04 |
| | | | | 370/329 |
| 2013/0194931 | A1* | 8/2013 | Lee | H04W 72/04 |
| | | | | 370/241 |
| 2013/0242886 | A1* | 9/2013 | Chen | H04L 5/14 |
| | | | | 370/329 |
| 2013/0242947 | A1* | 9/2013 | Chen | H04L 1/0039 |
| | | | | 370/335 |
| 2013/0301562 | A1* | 11/2013 | Liao | H04L 5/0053 |
| | | | | 370/329 |
| 2013/0336135 | A1* | 12/2013 | Lindoff | H04L 25/03343 |
| | | | | 370/252 |
| 2014/0321399 | A1* | 10/2014 | Liu | H04W 72/042 |
| | | | | 370/329 |
| 2014/0348012 | A1* | 11/2014 | Wu | H04L 5/0094 |
| | | | | 370/252 |
| 2015/0036609 | A1* | 2/2015 | Kim | H04L 5/0048 |
| | | | | 370/329 |
| 2015/0078271 | A1 | 3/2015 | Kim et al. | |
| 2015/0146658 | A1* | 5/2015 | Liu | H04L 25/03343 |
| | | | | 370/329 |
| 2015/0223209 | A1* | 8/2015 | Seo | H04W 72/042 |
| | | | | 370/329 |
| 2015/0280872 | A1* | 10/2015 | Berggren | H04L 5/005 |
| | | | | 370/330 |
| 2015/0304091 | A1* | 10/2015 | Gou | H04L 5/0091 |
| | | | | 370/329 |
| 2015/0304994 | A1* | 10/2015 | Kim | H04W 72/042 |
| | | | | 370/280 |
| 2015/0358134 | A1* | 12/2015 | Hammarwall | H04L 25/03949 |
| | | | | 370/330 |
| 2016/0013904 | A1* | 1/2016 | Seo | H04W 74/006 |
| | | | | 370/329 |
| 2016/0028513 | A1* | 1/2016 | Werner | H04L 5/0026 |
| | | | | 370/330 |
| 2016/0057716 | A1* | 2/2016 | Kim | H04L 5/0007 |
| | | | | 370/350 |
| 2016/0057720 | A1* | 2/2016 | Kim | H04L 5/0048 |
| | | | | 370/350 |
| 2016/0087774 | A1* | 3/2016 | Guo | H04L 5/0051 |
| | | | | 370/329 |
| 2016/0095127 | A1 | 3/2016 | Roh et al. | |
| 2016/0127153 | A1 | 5/2016 | Jiang et al. | |
| 2016/0150548 | A1* | 5/2016 | Wu | H04W 72/082 |
| | | | | 370/329 |
| 2016/0227520 | A1* | 8/2016 | Davydov | H04L 5/00 |
| 2016/0323859 | A1* | 11/2016 | Liu | H04L 5/0048 |
| 2016/0373229 | A1* | 12/2016 | You | H04L 1/0026 |
| 2017/0019915 | A1* | 1/2017 | Nogami | H04L 5/0053 |
| 2017/0156132 | A1* | 6/2017 | Blankenship | H04L 5/001 |
| 2017/0289869 | A1* | 10/2017 | Nogami | H04W 36/06 |
| 2017/0325258 | A1* | 11/2017 | Nogami | H04L 5/0092 |
| 2017/0373809 | A1* | 12/2017 | Kim | H03M 13/6362 |
| 2018/0013529 | A1* | 1/2018 | You | H04L 5/00 |
| 2018/0034608 | A1 | 2/2018 | Seo et al. | |
| 2018/0097663 | A1* | 4/2018 | Jiang | H04L 5/00 |
| 2018/0145809 | A1* | 5/2018 | Kwak | H04L 5/0051 |
| 2018/0279294 | A1* | 9/2018 | Gao | H04L 5/0016 |
| 2018/0343642 | A1* | 11/2018 | Lee | H04L 5/0053 |
| 2019/0141700 | A1* | 5/2019 | Kwak | H04L 5/0053 |
| 2019/0190572 | A1* | 6/2019 | Osawa | H04B 7/0456 |
| 2019/0238247 | A1* | 8/2019 | Lee | H04L 5/0007 |
| 2019/0260436 | A1* | 8/2019 | Davydov | H04L 25/0228 |
| 2019/0349221 | A1* | 11/2019 | Jiang | H04B 7/0421 |

FOREIGN PATENT DOCUMENTS

JP         5980926 B2        8/2016
KR    10-2017-0123960 A     11/2017

OTHER PUBLICATIONS

Samsung, 'Discussion on precoding granularity in NR', R1-1612481, 3GPP TSG RAN WG1 #87, Reno, USA, Nov. 4, 2016.
Intel Corporation, 'Study on PRB bundling for NR', R1-1611975, 3GPP TSG RAN WG1 Meeting #87, Reno, USA, Nov. 6, 2016.

(56) References Cited

OTHER PUBLICATIONS

Intel Corporation; On DM-RS enhancements for FD-MIMO; 3GPP TSG RAN WG1 Meeting #80; R1-150239; Feb. 17-21, 2015; Athens, Greece.
European Search Report dated Jul. 29, 2019; European Appln. No. 17873506.4-1219 / 3510718 PCT/KR2017013313.
Indian Office Action dated Dec. 9, 2021, issued in Indian Patent Application No. 201937018886.
Huawei et al., "DL DM-RS for data transmissions", R1-1611244, 3GPP TSG RAN WG1 Meeting #87, Reno, USA, Nov. 4, 2016.
Chinese Notice of Allowance dated Mar. 11, 2022, issued in Chinese Patent Application No. 201780072240.4.

* cited by examiner

* A, B, C, D indicate DMRS port number

METHOD AND APPARATUS FOR CHANNEL ESTIMATION AND DATA DECODING IN WIRELESS COMMUNICATION SYSTEM

CROSS-REFERENCE TO RELATED APPLICATION(S)

This application is a continuation application of prior application Ser. No. 15/821,267, filed on Nov. 22, 2017, which was based on and claimed priority under 35 U.S.C. § 119(e) of a U.S. Provisional application Ser. No. 62/425,299, filed on Nov. 22, 2016, in the U.S. Patent and Trademark Office, and under 35 U.S.C. § 119(a) of a Korean patent application number 10-2016-0168921, filed on Dec. 12, 2016, in the Korean Intellectual Property Office, and of a Korean patent application number 10-2017-0003609, filed on Jan. 10, 2017, in the Korean Intellectual Property Office, the disclosure of each of which is incorporated by reference herein in its entirety.

TECHNICAL FIELD

The present disclosure relates to a wireless communication system. More particularly, the present disclosure relates to a method and an apparatus that enable the base station (BS) and the terminal to perform channel estimation and data decoding using a reference signal (RS).

BACKGROUND

Since commercial deployment of fourth generation (4G) communication systems, to meet the ever increasing demand for wireless data traffic, efforts have been made to develop improved fifth generation (5G) or pre-5G communication systems. As such, 5G or pre-5G communication systems are also called "beyond 4G network" or "post long-term evolution (LTE) system". To achieve higher data rates, 5G communication systems consider utilization of the millimeter wave (mmWave) band (e.g., 60 GHz band). To decrease path loss and increase the transmission distance in the mmWave band, various technologies including beamforming, massive multiple-input multiple-output (massive MIMO), full dimensional MIMO (FD-MIMO), array antennas, analog beamforming, and large scale antennas are considered for 5G communication systems. To improve system networks in 5G communication systems, technology development is under way regarding evolved small cells, advanced small cells, cloud radio access networks (cloud RANs), ultra-dense networks, device-to-device (D2D) communication, wireless backhaul, moving networks, cooperative communication, coordinated multi-points (CoMP), reception interference cancellation, and the like. In addition, advanced coding and modulation (ACM) schemes, such as hybrid FSK and QAM modulation (FQAM) and sliding window superposition coding (SWSC), and advanced access technologies, such as filter bank multi carrier (FBMC), non-orthogonal multiple access (NOMA), and sparse code multiple access (SCMA) are also under development for 5G communication systems.

Meanwhile, the Internet is evolving from a human centered network where humans create and consume information into the Internet of Things (IoT) where distributed elements or things process and exchange information. There has also emerged the Internet of Everything (IoE) technology that combines IoT technology with big data processing technology through connection with cloud servers. To realize IoT services, base technologies, such as sensing, wired/wireless communication and network infrastructure, service interfacing and security are needed, and technologies interconnecting things, such as sensor networks, machine-to-machine (M2M) or machine type communication (MTC) are under development. In IoT environments, it is possible to provide intelligent Internet technology services, which collect and analyze data created by interconnected things to add new values to human life. Through convergence and combination between existing information technologies and various field technologies, IoT technology may be applied to various areas, such as smart homes, smart buildings, smart cities, smart or connected cars, smart grids, health-care, smart consumer electronics, and advanced medical services.

Accordingly, various attempts are being made to apply 5G communication systems to IoT networks. For example, sensor networks and M2M or MTC are being realized by use of 5G communication technologies including beamforming, MIMO and array antennas. Application of cloud RANs to big data processing described above may be an instance of convergence of 5G communication technology and IoT technology.

A reference signal (RS) is a signal that is used to measure the state of the channel between the base station (BS) and users, such as channel strength, distortion, interference strength and Gaussian noise, in a wireless mobile communication system and is also used to assist in demodulation and decoding of received data symbols. One of the primary uses of the (RS) is to measure the radio channel state. The receiver can determine the state of the radio channel between itself and the transmitter by measuring the received strength of a (RS) that has been transmitted by the transmitter at a given transmission power and has passed through the radio channel. The state of the radio channel is used to determine the data rate the receiver will request to the transmitter.

In the LTE system, the terminal performs data channel decoding and channel estimation by using the demodulation reference signal (DMRS) among various reference signals.

Therefore, a need exists for a method in the 5G system for improving channel estimation performance using the DMRS.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method and an apparatus that enable a base station (BS) and a terminal to perform channel estimation and data decoding using a reference signal (RS).

In accordance with an aspect of the present disclosure, a method of a terminal in a wireless communication system is provided. The method includes receiving first information configuring a physical resource block (PRB) bundling size indication based on second information, receiving the second information indicating the number of at least one PRB, if the PRB bundling size indication is configured, and estimating the channel state based on an assumption that the same precoding is applied to the at least one PRB based on the second information.

In accordance with another aspect of the present disclosure, a method of a base station (BS) in a wireless communication system is provided. The method includes transmitting first information configuring a PRB bundling size indication based on second information, and transmitting the second information indicating the number of at least one PRB, if the PRB bundling size indication is configured, and wherein the channel state is estimated based on an assumption that the same precoding is applied to the at least one PRB based on the second information.

In accordance with another aspect of the present disclosure, a terminal in a wireless communication system is provided. The terminal includes a transceiver, and at least one processor coupled with the transceiver and configured to receive first information configuring a PRB bundling size indication based on second information, receive the second information indicating the number of at least one PRB, if the PRB bundling size indication is configured, and estimate the channel state based on an assumption that the same precoding is applied to the at least one PRB based on the second information.

In accordance with another aspect of the present disclosure, a BS in a wireless communication system is provided. The BS includes a transceiver, and at least one processor coupled with the transceiver and configured to transmit first information configuring a PRB bundling size indication based on second information, and transmit the second information indicating the number of at least one PRB, if the PRB bundling size indication is configured, wherein the channel state is estimated based on an assumption that the same precoding is applied to the at least one PRB based on the second information.

In a feature of the present disclosure, there are provided a method and an apparatus for improving channel estimation performance using the DMRS when the BS and the terminal perform data decoding using the DMRS.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
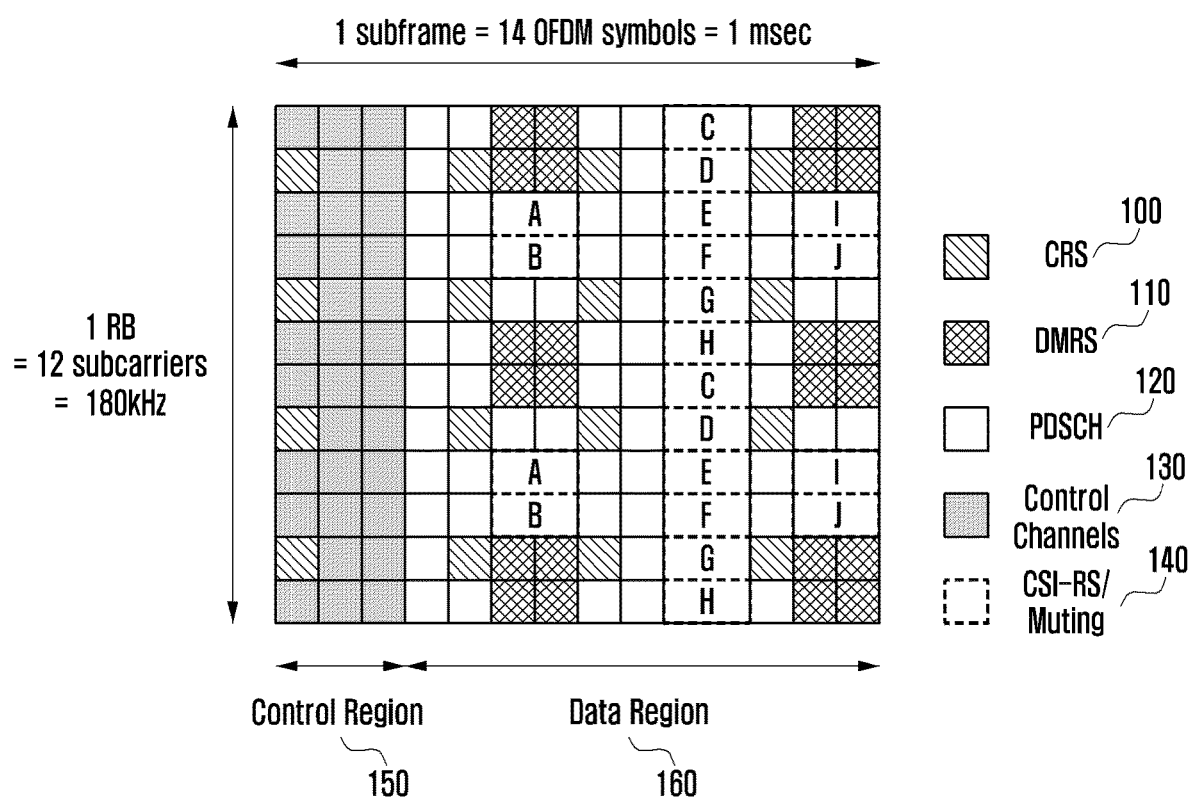
FIG. 1 illustrates radio resources of one subframe and one resource block (RB), which are minimum units of downlink scheduling in a long-term evolution (LTE) or LTE-advanced (LTE-A) system according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

In the drawings, some elements are exaggerated, omitted, or only outlined in brief, and thus, may not be drawn to scale. The same or similar reference symbols are used throughout the drawings to refer to the same or like parts.

Meanwhile, it is known to those skilled in the art that blocks of a flowchart (or sequence diagram) and a combination of flowcharts may be represented and executed by computer program instructions. These computer program instructions may be loaded on a processor of a general purpose computer, special purpose computer or programmable data processing equipment. When the loaded program instructions are executed by the processor, they create a means for carrying out functions described in the flowchart. As the computer program instructions may be stored in a computer readable memory that is usable in a specialized computer or a programmable data processing equipment, it is also possible to create articles of manufacture that carry out functions described in the flowchart. As the computer program instructions may be loaded on a computer or a programmable data processing equipment, when executed as processes, they may carry out operations of functions described in the flowchart.

A block of a flowchart may correspond to a module, a segment or a code containing one or more executable instructions implementing one or more logical functions, or to a part thereof. In some cases, functions described by blocks may be executed in an order different from the listed order. For example, two blocks listed in sequence may be executed at the same time or executed in reverse order.

In various embodiments of the description, the word "unit", "module" or the like may refer to a software component or hardware component, such as an field programmable gate array (FPGA) or application-specific integrated circuit (ASIC) capable of carrying out a function or an operation. However, "unit" or the like is not limited to hardware or software. A unit or the like may be configured so as to reside in an addressable storage medium or to drive one or more processors. Units or the like may refer to software components, object-oriented software components, class components, task components, processes, functions, attributes, procedures, subroutines, program code segments, drivers, firmware, microcode, circuits, data, databases, data structures, tables, arrays or variables. A function provided by a component and unit may be a combination of smaller components and units, and may be combined with others to compose large components and units. Components and units may be configured to drive a device or one or more processors in a secure multimedia card.

Descriptions of well-known functions and structures incorporated herein may be omitted to avoid obscuring the subject matter of the present disclosure. Particular terms may be defined to describe the disclosure in the best manner. Accordingly, the meaning of specific terms or words used in the specification and the claims should be construed in accordance with the spirit of the disclosure.

The present disclosure relates generally to a wireless mobile communication system, and more particularly, to a method of utilizing a reference signal (RS) in a wireless mobile communication system employing a multi-carrier multiple access scheme, such as orthogonal frequency division multiple access (OFDMA).

In contrast to early mobile communication systems having provided voice-oriented services only, to provide data services and multimedia services, current mobile communication systems are evolving into high-speed and high-quality wireless packet data communication systems. To this end, several standardization bodies including third generation partnership project (3GPP), 3GPP2, and Institute of Electrical and Electronics Engineers (IEEE) are working on the standardization of evolved third generation (3G) mobile communication systems employing multi-carrier multiple access schemes. Recently, various mobile communication standards, such as long-term evolution (LTE) of 3GPP, ultra-mobile broadband (UMB) of 3GPP2 and IEEE 802.16m have been developed to support high-speed and high-quality wireless packet data services based on multi-carrier multiple access schemes.

Existing evolved 3G mobile communication systems, such as LTE, UMB, and 802.16m are based on multi-carrier multiple access schemes and utilize various techniques including MIMO (MIMO, multiple antennas), beamforming, adaptive modulation and coding (AMC), and channel sensitive scheduling to improve the transmission efficiency. These various techniques may improve the transmission efficiency and system throughput performance by concentrating transmission powers of multiple antennas or adjusting the amount of data to be transmitted by multiple antennas according to channel quality, and by selectively transmitting data to users with good channel conditions.

As most of these techniques operate based on channel state information between the base station (BS), or an evolved Node B (eNB)) and the terminal (i.e., a user equipment (UE) or a mobile station (MS)), it is necessary for the eNB or UE to measure the state of the channel between them. At this time, the channel status indication RS or channel state information RS (CSI-RS) is used. The eNB is a device located at a certain place for performing downlink transmission and uplink reception, and one eNB performs transmission and reception operations for multiple cells.

To increase the data transmission rate and system capacity, existing 3G and fourth generation (4G) mobile communication systems, such as LTE and LTE-advanced (LTE-A) utilize MIMO technology to transmit data using a plurality of transmission/reception antennas. In MIMO, the plurality of transmission/reception antennas are used to transmit multiple information streams in a spatially separated manner. Transmitting multiple information streams in a spatially separated manner is referred to as spatial multiplexing. In general, how many spatially multiplexed information streams can be used depends on the number of antennas of the transmitter and the receiver. The number of information streams that can be spatially multiplexed is referred to as the transmission rank. The MIMO technology provided by the LTE-A standards (up to Release 11) may support up to rank 8 spatial multiplexing for 16 transmit antennas and 8 receive antennas.

The new radio (NR) technology, which is for the fifth generation mobile communication system currently being discussed, aims to support a variety of services, such as enhanced mobile broadband (eMBB), massive machine type communication (mMTC), and ultra-reliable and low latency communication. To achieve this goal, the NR system tries to minimize the number of RSs that are to be transmitted always and transmit RSs non-periodically, so that time and frequency resources can be flexibly used for signal transmission.

The RS is a signal that is used to measure the state of the channel between the BS and users, such as channel strength, distortion, interference strength and Gaussian noise, in a wireless mobile communication system and is used to assist in demodulation and decoding of received data symbols. The primary use of the RS is to measure the radio channel state. The receiver can determine the state of the radio channel between itself and the transmitter by measuring the received strength of a RS that has been transmitted by the transmitter at a given transmission power and has passed through the radio channel. The state of the radio channel may be used to determine the data rate the receiver will request to the transmitter.

However, since radio resources, such as time, frequency, and transmission power for signal transmission are limited in a typical mobile communication system, when a large amount of radio resources are allocated to RSs, the radio resources that can be allocated to data signals are relatively reduced. As such, the radio resources allocated to RSs should be appropriately determined based on the system throughput. More particularly, in the case of MIMO where transmission and reception are performed using a plurality of antennas, it is very important to assign and measure RSs from a technical point of view.

The reference signal (RS) is a signal that enables a terminal receiving from the BS to perform channel estimation. In the LTE system, there are provided a common RS (CRS) and a demodulation RS (DMRS) as a UE-specific RS. The CRS is a RS transmitted over the entire downlink bandwidth and can be received by all UEs, and may be used for channel estimation, feedback information composition, and decoding of control and data channels of UEs. The DMRS is also a RS transmitted over the entire downlink bandwidth. The DMRS may be used for data channel decoding and channel estimation of a specific UE and is, unlike the CRS, not used for feedback information composition. Therefore, the DMRS is transmitted through the physical resource block (PRB) to be scheduled by the UE.

In the LTE system, to perform channel estimation for data decoding using the DMRS, channel estimation is carried out, using PRB bundling associated with the system bandwidth, within a precoding resource block group (PRG) serving as a bundling unit. In addition, in the time domain, channel estimation is performed on the assumption that precoding is the same for the DMRS during only one transmission time interval (TTI). Unlike CRS, because of its limited use in time and frequency bands, DMRS estimation performance is lower than CRS estimation performance. Thus, a 5G system needs a method for improving channel estimation performance using the DMRS.

In the following description, the NR, LTE, and LTE-A systems are taken as an example for describing the present disclosure. However, the present disclosure is applicable to other communication systems using licensed and unlicensed bands without significant modification. In the following description, the LTE-A system can be interpreted to include both the LTE-A and LTE systems.

FIG. 1 illustrates radio resources of one subframe and one RB, which are minimum units of downlink scheduling in an LTE or LTE-A system according to an embodiment of the present disclosure.

Referring to FIG. 1, the radio resource includes one subframe in the time axis and includes one RB on the frequency axis. Such a radio resource includes 12 subcarriers in the frequency domain, includes 14 OFDM symbols in the time domain, and thus, includes 168 specific frequency and time positions in total. In the LTE or LTE-A system, each frequency and time position in FIG. 1 is referred to as a resource element (RE).

The following several types of signals may be transmitted through the radio resource shown in FIG. 1.

1. Cell specific RS (CRS): A CRS 100 is a RS periodically transmitted for all terminals belonging to one cell, and may be commonly used by a plurality of terminals.

2. DMRS: A DMRS 110 is a RS transmitted for a specific terminal and is transmitted only when data is transmitted to the specific terminal. The DMRS may be configured using up to 8 DMRS antenna ports (or just ports). In the LTE-A system, ports 7 to 14 correspond to DMRS ports and these ports maintain orthogonality therebetween using code division multiplexing (CDM) or frequency division multiple (FDM) to prevent interference therebetween.

3. Physical downlink shared channel (PDSCH): A PDSCH 120 is a data channel transmitted in the downlink and is used by the BS to transmit traffic to the terminal. The PDSCH is transmitted by using an RE through which a RS is not transmitted in a data region 160 of FIG. 1.

4. Channel status information RS (CSI-RS): CSI-RS 140 is a RS transmitted for terminals belonging to one cell and is used for channel state measurement. A plurality of CSI-RSs may be transmitted to one cell.

5. Other control channels (physical hybrid-ARQ indicator channel (PHICH), physical control format indicator channel (PCFICH), physical downlink control channel (PDCCH)): Control channels 130 are used to provide control information required by the terminal to receive the PDSCH or used to transmit acknowledgement (ACK)/negative acknowledgement (NACK) information for operating HARQ with respect to an uplink data transmission. The control channels 130 are transmitted in a control region 150.

In addition to the signals described above, the LTE-A system may configure muting so that a CSI-RS from another BS can be received by terminals of the corresponding cell without interference. Muting may be applied to a position where a CSI-RS can be transmitted, and the terminal receives a traffic signal normally by skipping the corresponding radio resource. In the LTE-A system, muting is also referred to as zero-power CSI-RS. This is because muting is applied to the CSI-RS position and transmission power is not transmitted due to the characteristic of muting.

Referring to FIG. 1, the CSI-RS may be transmitted using a part of the positions labelled A, B, C, D, E, F, G, H, I and J according to the number of antennas for CSI-RS transmission. Muting may also be applied to a part of the positions labelled A, B, C, D, E, F, G, H, I and J. In particular, the CSI-RS may be transmitted via two, four or eight REs depending on the number of antenna ports for CSI-RS transmission. In FIG. 1, when the number of antenna ports is two, the CSI-RS is transmitted through a half of a specific pattern, when the number of antenna ports is four, the CSI-R is transmitted through the whole of a specific pattern, and when the number of antenna ports is eight, the CSI-RS is transmitted using two patterns. In contrast, muting is always applied on a pattern basis. For example, muting may be applied to multiple patterns, but cannot be applied to only a part of one pattern unless the muted position overlaps a CSI-RS position. Muting may be applied to a part of one pattern only when the muted position overlaps a CSI-RS position.

When the CSI-RS is transmitted for 2 antenna ports, CSI-RSs for the two antenna ports are transmitted through two REs connected in the time domain and the signals of the individual antenna ports are separated by using orthogonal codes. When the CSI-RS is transmitted for 4 antenna ports, CSI-RSs for two antenna ports are transmitted through two REs in the same way as above and CSI-RSs for the remaining two antenna ports are transmitted through additional two REs in the same way. The same process may be applied to the case where the CSI-RS is transmitted for 8 antennas ports. When the CSI-RS is transmitted for 12 or 16 antenna ports, three sets of CSI-RS transmission positions for four antenna ports may be combined together or two sets of CSI-RS transmission positions for eight antenna ports may be combined together.

In addition, the terminal may be allocated channel status information interference measurement information (CSI-IM), or interference measurement resources (IMR)) along with the CSI-RS. The CSI-IM resource has the same structure and position as the CSI-RS resource supporting four ports. The CSI-IM is a resource for enabling a terminal receiving data from one or more BS s to accurately measure the interference caused by a neighboring BS. For example, to accurately measure the amount of interference from a neighboring BS when the neighboring BS transmits data and when the neighboring BS does not transmit data, the BS may configure the CSI-RS resource and two CSI-IM resources, permit one CSI-IM resource to transmit the signal of the neighboring BS at all times, and prevent the other CSI-IM resource from transmitting the signal of the neighboring BS at all times.

Table 1 below shows radio resource control (RRC) fields constituting the CSI-RS configuration.

TABLE 1

| CSI-RS config | CSI-IM config | CQI reporting config | Etc |
|---|---|---|---|
| No. antenna ports Resource config Time and frequency position in a subframe Subframe config Periodicity and subframe offset Qcl-CRS-info (QCL Type B) CRS information for CoMP | Resource config Time and frequency position in a subframe Subframe config Periodicity and subframe offset | Periodic Mode, resource, periodicity, offset . . . Aperiodic Mode.. PMI/RI report RI reference CSI process SubframePattern | $P_c$ Codebook subset restriction |

The settings for channel status reporting based on periodic CSI-RSs in the CSI process can be classified into four categories as shown in Table 1 above. CSI-RS config is to set the time and frequency positions of the CSI-RS REs. Here, the number of antenna ports specifies the number of ports that are supported by the corresponding CSI-RS. Resource config specifies the RE position in the RB, and Subframe config specifies the period and offset of the subframe. Table 2 shows Resource config and Subframe config settings supported by the current LTE system.

TABLE 2

| | | Number of CSI reference signals configured | | | | | |
|---|---|---|---|---|---|---|---|
| CSI reference signal | | 1 or 2 | | 4 | | 8 | |
| | configuration | (k', l') | $n_s$ mod 2 | (k', l') | $n_s$ mod 2 | (k', l') | $n_s$ mod 2 |
| Frame structure type 1 and 2 | 0 | (9, 5) | 0 | (9, 5) | 0 | (9, 5) | 0 |
| | 1 | (11, 2) | 1 | (11, 2) | 1 | (11, 2) | 1 |
| | 2 | (9, 2) | 1 | (9, 2) | 1 | (9, 2) | 1 |
| | 3 | (7, 2) | 1 | (7, 2) | 1 | (7, 2) | 1 |
| | 4 | (9, 5) | 1 | (9, 5) | 1 | | |
| | 5 | (8, 5) | 0 | (8, 5) | 0 | | |
| | 6 | (10, 2) | 1 | (10, 2) | 1 | | |
| | 7 | (8, 2) | 1 | (8, 2) | 1 | | |
| | 8 | (6, 2) | 1 | (6, 2) | 1 | | |
| | 9 | (8, 5) | 1 | (8, 5) | 1 | | |
| | 10 | (3, 5) | 0 | | | | |
| | 11 | (2, 5) | 0 | | | | |
| | 12 | (5, 2) | 1 | | | | |
| | 13 | (4, 2) | 1 | | | | |
| | 14 | (3, 2) | 1 | | | | |
| | 15 | (2, 2) | 1 | | | | |
| | 16 | (1, 2) | 1 | | | | |
| | 17 | (0, 2) | 1 | | | | |
| | 18 | (3, 5) | 1 | | | | |
| | 19 | (2, 5) | 1 | | | | |
| Frame structure type 2 only | 20 | (11, 1) | 1 | (11, 1) | 1 | (11, 1) | 1 |
| | 21 | (9, 1) | 1 | (9, 1) | 1 | (9, 1) | 1 |
| | 22 | (7, 1) | 1 | (7, 1) | 1 | (7, 1) | 1 |
| | 23 | (10, 1) | 1 | (10, 1) | 1 | | |
| | 24 | (8, 1) | 1 | (8, 1) | 1 | | |
| | 25 | (6, 1) | 1 | (6, 1) | 1 | | |

TABLE 2-continued

| | | |
|---|---|---|
| 26 | (5, 1) | 1 |
| 27 | (4, 1) | 1 |
| 28 | (3, 1) | 1 |
| 29 | (2, 1) | 1 |
| 30 | (1, 1) | 1 |
| 31 | (0, 1) | 1 |

| CSI-RS-SubframeConfig $I_{CSI-RS}$ | CSI-RS periodicity $T_{CSI-RS}$ (subframes) | CSI-RS subframe offset $\Delta_{CSI-RS}$ (subframes) |
|---|---|---|
| 0-4 | 5 | $I_{CSI-RS}$ |
| 5-14 | 10 | $I_{CSI-RS} - 5$ |
| 15-34 | 20 | $I_{CSI-RS} - 15$ |
| 35-74 | 40 | $I_{CSI-RS} - 35$ |
| 75-154 | 80 | $I_{CSI-RS} - 75$ |

The terminal can identify the frequency and time position, the period and offset of the CSI-RS through Table 2 above. Qcl-CRS-info sets quasi co-location information for CoMP. CSI-IM config is to set the frequency and time position of the CSI-IM to measure the interference. Since the CSI-IM is always configured based on four ports, it is not necessary to set the number of antenna ports. Resource config and Subframe config are set in the same way as the CSI-RS.

Channel quality indicator (CQI) report config specifies how to report the channel state using the corresponding CSI process. This configuration may specify periodic channel status reporting, aperiodic channel status reporting, precoder matrix indicator/rank indicator (PMI/RI) reporting, the RI reference channel state information (CSI) process, and the subframe pattern. In addition, there are Pc that indicates the power ratio between the PDSCH RE and the CSI-RS RE required for the UE to generate the channel status report, and Codebook subset restriction indicating the codebook to be used.

As described above, in the case of full dimensional MIMO (FD-MIMO), the BS should configure an RS resource for measuring channels of 8 or more antennas and transmit the same to the terminal. Here, the number of RSs may differ depending on the BS antenna configuration and measurement type. For example, in LTE-A Release 13, it is possible to configure {1, 2, 4, 8, 12, 16}-port CSI-RSs under the assumption of full port mapping. Here, full port mapping means that every TXRU has a dedicated CSI-RS port for channel estimation.

Meanwhile, it is highly likely that more than 16 TXRUs will be introduced after LTE-A release 14. In addition, the number of supported antenna array configurations will increase significantly compared to Release 13. This indicates that a varying number of TXRUs should be supported in LTE-A release 14. In the case of full port mapping, {18, 20, 22, 24, 26, 28, 30, 32}-port CSI-RSs can be considered in terms of the number of CSI-RS ports. Considering that two different polarized antennas may exist at the same position in a polarized antenna structure, {9, 10, 11, 12, 13, 14, 15, 16} different AP positions can be considered. Here, the shape of a two-dimensional rectangular or square antenna array can be given by N1 different AP positions in the first dimension (vertical or horizontal direction) and N2 different AP positions in the second dimension (horizontal or vertical direction), and various combinations are possible for a given number of ports. For example, there are various antenna array configurations depending on the number of CSI-RS ports. An example of such a multidimensional antenna arrangement is shown in FIG. 2.

Figure 2:
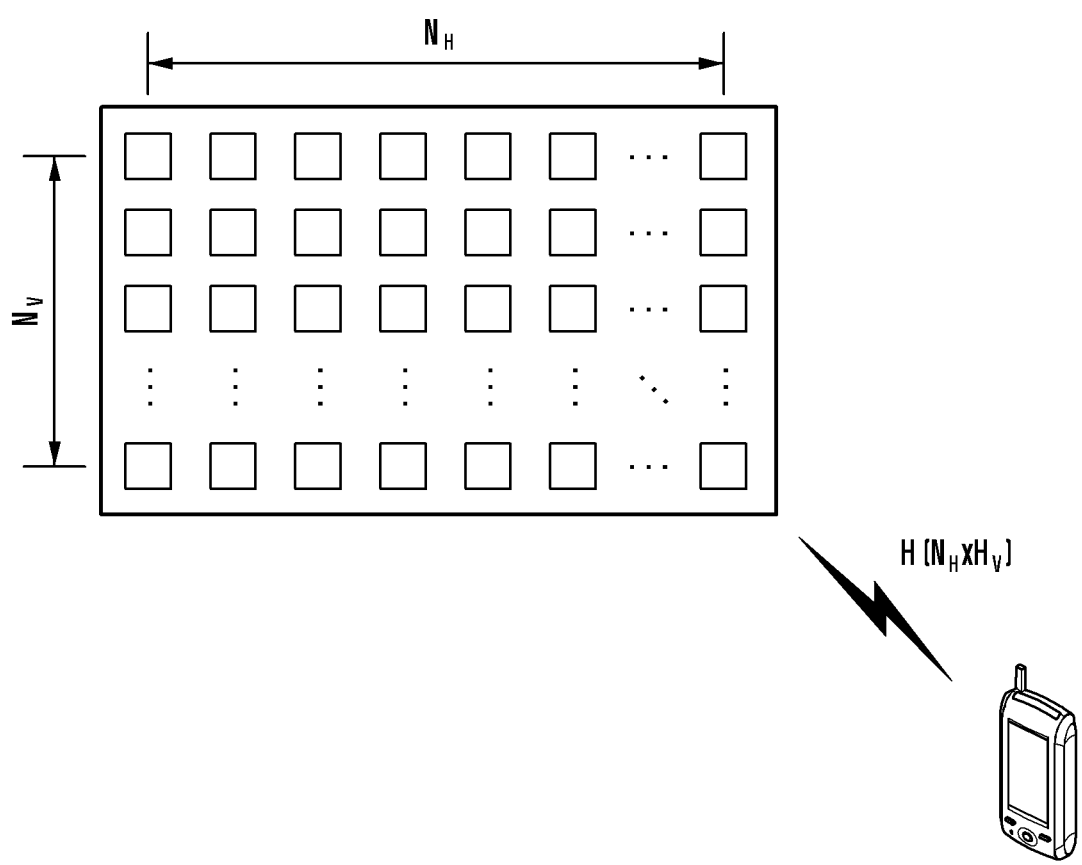
FIG. 2 illustrates a multidimensional antenna arrangement according to an embodiment of the present disclosure.

FIG. 2 illustrates a of multidimensional antenna arrangement according to an embodiment of the present disclosure.

Referring to FIG. 2, in a cellular communication system, the BS needs to transmit a RS to the terminal for measuring the downlink channel state. In the LTE-A system of 3GPP, the terminal uses the CRS or CSI-RS transmitted by the BS to measure the channel status between the BS and the terminal. The channel status needs to basically consider some factors including the amount of interference in the downlink. The interference amount in the downlink includes an interference signal and thermal noise that are generated by antennas belonging to the neighboring BS, and this is important for the terminal to determine the channel condition in the downlink. For example, when a BS having one transmit antenna transmits a signal to a terminal having one receive antenna, the terminal uses the RS received from the BS to determine the energy per symbol received in the downlink and the amount of interference received in the same interval where the corresponding symbols are received, and computes the value of energy per symbol to interference density ratio (Es/Io). The determined Es/Io is converted into a data rate value or corresponding value and is notified to the BS in the form of a CQI. Thereby, the BS may determine the data rate to be used for downlink transmission to the terminal.

In the case of the LTE-A system, the terminal may feedback information on the downlink channel state to the BS, enabling the BS to use this channel state information for downlink scheduling. For example, the terminal measures the RS transmitted from the BS in the downlink and feedbacks the extracted information to the BS in the form defined in the LTE-A standard. In the LTE-A system, the following three pieces of information are generally fed back by the terminal.

Rank indicator (RI): The number of spatial layers that may be received by the terminal in the current channel state.

Precoder matrix indicator (PMI): The indicator to a precoding matrix preferred by the terminal in the current channel state.

Channel quality indicator (CQI): The maximum data rate that may be received by the terminal in the current channel state. The CQI may be replaced by a SINR value, coding rate and modulation scheme, or data efficiency per frequency that may be used similarly to the maximum data rate.

The RI, PMI and CQI may have a meaning in an inter-related manner. For example, the precoding matrix supported in LTE-A is differently defined for each rank. For this reason, the PMI value when the RI is 1 and the PMI value when the RI is 2 are interpreted differently even if the values are the same. In addition, when the terminal determines the CQI value, it assumes that the rank value and PMI value notified by the terminal to the BS are applied in the BS. For example, when the terminal has notified the BS of RI_X, PMI_Y and CQI_Z, the terminal may receive data at a data rate corresponding to CQI_Z when the rank is RI_X and the precoding matrix is PMI_Y. As such, when the terminal calculates the CQI value, it may assume the transmission scheme that will be used by the BS and achieve optimized performance when actual transmission is performed using the assumed transmission scheme.

For channel information generation and reporting, the BS having a large number of antennas configure RS resources for measuring channels of eight or more antennas and notify the same to the terminal.

Figure 3:
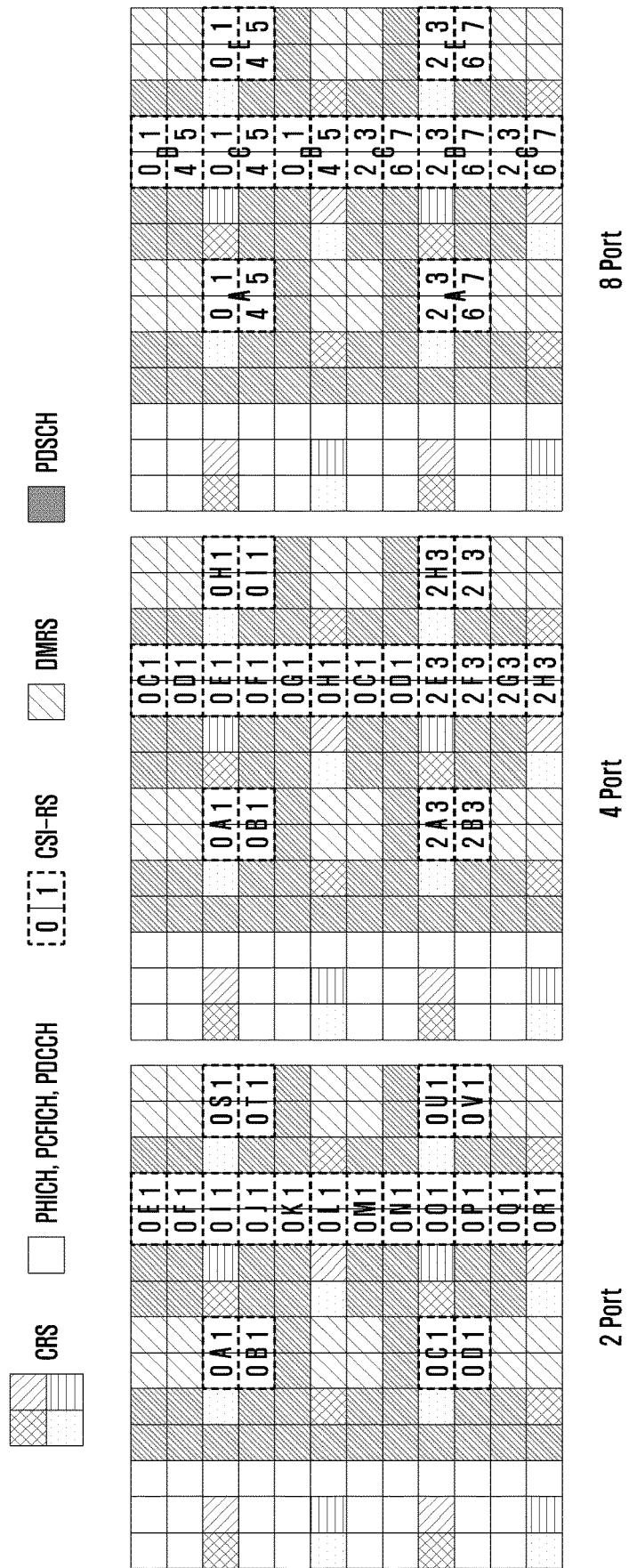
FIG. 3 illustrates available channel state information reference signal RS (CSI-RS) resources for 2 ports, 4 ports, and 8 ports according to an embodiment of the present disclosure.

FIG. 3 illustrates available CSI-RS resources for 2 ports, 4 ports, and 8 ports according to an embodiment of the present disclosure.

Referring to FIG. 3, the available CSI-RS resources may include up to 48 REs, but it is possible to configure up to 8 CSI-RSs for one CSI process at present. Hence, a new CSI-RS configuration scheme is needed to support an FD-MIMO system that can operate based on more than 8 CSI-RS ports.

For example, in LTE-A release 13, one, two, four, eight, twelve, or sixteen CSI-RS ports can be configured for one CSI process. Specifically, the existing mapping rule is applied to {1, 2, 4, 8}-port CSI-RSs, an aggregation of three 4-port CSI-RS patterns is applied to the 12-port CSI-RS, and an aggregation of two 8-port CSI-RS patterns is applied to the 16-port CSI-RS. Additionally, in LTE-A release 13, CDM-2 or CDM-4 using an orthogonal cover code (OCC) of length 2 or 4 is supported for the 12 or 16-port CSI-RS.

In addition, in the case of CSI-RS power boosting based on CDM-2, up to 9 dB power boosting is required for full power utilization of the 12 or 16-port CSI-RS based on CDM-2 compared with the PDSCH. This means that higher performance hardware is needed for full power utilization when the 12 or 16-port CSI-RS is operated based on CDM-2. As such, the 12 or 16-port CSI-RS based on CDM-4 is introduced in Release 13. In this case, full power utilization becomes possible through 6 dB power boosting as before. Further, the CDM-8 based CSI-RS is introduced for up to 32-port CSI-RSs in Release 14.

As described before, the DMRS is a RS for a specific terminal and is transmitted only when data is transmitted to the terminal. The DMRS can have a total of 8 DMRS ports. In the LTE-A system, ports 7 to 14 correspond to DMRS ports and these ports maintain orthogonality therebetween using CDM or FDM to prevent interference therebetween. The RS sequence for the DMRS may be given by Equation 1 below.

$$r(m) = \frac{1}{\sqrt{2}}(1 - 2 \cdot c(2m)) + j\frac{1}{\sqrt{2}}(1 - 2 \cdot c(2m+1)),$$ Equation 1

$$m = \begin{cases} 0, 1, \ldots, 12N_{RB}^{max,DL} - 1 & \text{normal cyclic prefix} \\ 0, 1, \ldots, 16N_{RB}^{max,DL} - 1 & \text{extended cyclic prefix} \end{cases}$$

Here, c(i) is a pseudo-random sequence, and the initial state of a scrambling sequence for the DMRS is generated for every subframe using Equation 2 below.

$$c_{init} = (\lfloor n_s/2 \rfloor + 1) \cdot (2n_{ID}^{(nSCID)} + 1) \cdot 2^{16} + n_{SCID}$$ Equation 2

In Equation 2, $n_s$ indicates a slot index of a frame and is an integer from 0 to 19. $n_{ID}^{(nSCID)}$ and $n_{SCID}$ and are values related to DMRS scrambling. $n_{ID}^{(nSCID)}$ corresponds to a virtual Cell ID and is an integer from 0 to 503. $n_{SCID}$ corresponds to a scrambling ID and is 0 or 1. In the LTE-A system, one of two preset values of $n_{ID}^{(nSCID)}$ is determined according to the value of $n_{SCID}$. For example, as illustrated in Table 3 below, when $n_{SCID}$ is '0', the virtual Cell ID becomes "scramblingIdentity-r11" preset via higher layer signaling. When $n_{SCID}$ is 1, the virtual Cell ID becomes "scramblingIdentity2-r11" preset via higher layer signaling.

TABLE 3

```
-- ASN1START
DMRS-Config-r11 ::=          CHOICE {
   release                      NULL,
   setup                        SEQUENCE {
      scramblingIdentity-r11       INTEGER (0..503),
      scramblingIdentity2-r11      INTEGER (0..503)
   }
}
-- ASN1STOP
```

The RS sequence r(m) for the DMRS in Equation 1 is mapped to REs via Equation 3 below, when the PDSCH is assigned to $n_{PRB}$ for antenna port p=7, p=8 or p='7, 8, . . . , v+6.

$$a_{k,l}^{(p)} = w_p(l') \cdot r(3 \cdot l' \cdot N_{RB}^{max,DL} + 3 \cdot n_{PRB} + m')$$ Equation 3

Here, $$w_p(i) = \begin{cases} \bar{w}_p(i) & (m' + n_{PRB}) \bmod 2 = 0 \\ \bar{w}_p(3-i) & (m' + n_{PRB}) \bmod 2 = 1 \end{cases}$$

$$k = 5m' + N_{sc}^{RB} n_{PRB} + k'$$

$$k' = \begin{cases} 1 & p \in \{7, 8, 11, 13\} \\ 0 & p \in \{9, 10, 12, 14\} \end{cases}$$

$$l = \begin{cases} l' \bmod 2 + 2 & \text{if in a special subframe with configuration 3, 4, 8 or 9 (see Table 4.2-1)} \\ l' \bmod 2 + 2 + 3\lfloor l'/2 \rfloor & \text{if in a special subframe with configuration 1, 2, 6 or 7 (see Table 4.2-1)} \\ l' \bmod 2 + 5 & \text{if not in a special subframe} \end{cases}$$

$$l' = \begin{cases} 0, 1, 2, 3 & \text{if } n_s \bmod 2 = 0 \text{ and in a special subframe with configuration 1, 2, 6 or 7 (see Table 4.2-1)} \\ 0, 1 & \text{if } n_s \bmod 2 = 0 \text{ and not in special subframe with configuration 1, 2, 6 or 7 (see Table 4.2-1)} \\ 2, 3 & \text{if } n_s \bmod 2 = 1 \text{ and not in special subframe with configuration 1, 2, 6 or 7 (see Table 4.2-1)} \end{cases}$$

$$m' = 0, 1, 2$$

Here, $w_p(i)$ is shown in Table 4 below. Refer to LTE standard 3GPP TS 36.211 for Table 4.2-1 in the above equation.

TABLE 4

| Antenna port p | $[\overline{w}_p(0)\ \overline{w}_p(1)\ \overline{w}_p(2)\ \overline{w}_p(3)]$ |
|---|---|
| 7  | [+1 +1 +1 +1] |
| 8  | [+1 −1 +1 −1] |
| 9  | [+1 +1 +1 +1] |
| 10 | [+1 −1 +1 −1] |
| 11 | [+1 +1 −1 −1] |
| 12 | [−1 −1 +1 +1] |
| 13 | [+1 −1 −1 +1] |
| 14 | [−1 +1 +1 −1] |

In Table 2, the sequence $w_p(i)$ is an OCC for maintaining orthogonality between DMRS ports via CDM.

In the LTE system prior to Release 13, for multi-user MIMO (MU-MIMO), up to two orthogonal transport layers are supported using 12 DMRS REs per PRB and an OCC of length 2 based on antenna port p=7, 8 only. In addition, up to four quasi-orthogonal transport layers are supported using the $n_{SCID}$ value.

In downlink control information (DCI) format 2C and 2D, three bits are used to indicate the antenna port for transmitting the DMRS, $n_{SCID}$ value, and the number of layers with reference to Table 5 below. In Table 5, the first column refers to a case where the PDSCH is scheduled for transmission of one codeword, and the second column refers to a case where the PDSCH is scheduled for transmission of two codewords. Value=4, 5, 6 in the first column is used only for retransmission of a corresponding codeword. In the current LTE standard, according to Table 5, up to two orthogonal transport layers are supported for MU-MIMO transmission, and up to four quasi-orthogonal transport layers are supported using the $n_{SCID}$ value.

TABLE 5

| One Codeword: Codeword 0 enabled, Codeword 1 disabled | | Two Codewords: Codeword 0 enabled, Codeword 1 enabled | |
|---|---|---|---|
| Value | Message | Value | Message |
| 0 | 1 layer, port 7, $n_{SCID} = 0$ | 0 | 2 layers, ports 7-8, $n_{SCID} = 0$ |
| 1 | 1 layer, port 7, $n_{SCID} = 1$ | 1 | 2 layers, ports 7-8, $n_{SCID} = 1$ |
| 2 | 1 layer, port 8, $n_{SCID} = 0$ | 2 | 3 layers, ports 7-9 |
| 3 | 1 layer, port 8, $n_{SCID} = 1$ | 3 | 4 layers, ports 7-10 |
| 4 | 2 layers, ports 7-8 | 4 | 5 layers, ports 7-11 |
| 5 | 3 layers, ports 7-9 | 5 | 6 layers, ports 7-12 |
| 6 | 4 layers, ports 7-10 | 6 | 7 layers, ports 7-13 |
| 7 | Reserved | 7 | 8 layers, ports 7-14 |

For the DMRS after Release 13, up to four orthogonal DMRS ports are supported using an OCC of length 4 based on the indication table shown in Table 6.

TABLE 6

| One Codeword: Codeword 0 enabled, Codeword 1 disabled | | Two Codewords: Codeword 0 enabled, Codeword 1 enabled | |
|---|---|---|---|
| Value | Message | Value | Message |
| 0 | 1 layer, port 7, $n_{SCID} = 0$ (OCC = 2) | 0 | 2 layer, port 7-8, $n_{SCID} = 0$ (OCC = 2) |
| 1 | 1 layer, port 7, $n_{SCID} = 1$ (OCC = 2) | 1 | 2 layer, port 7-8, $n_{SCID} = 1$ (OCC = 2) |
| 2 | 1 layer, port 8, $n_{SCID} = 0$ (OCC = 2) | 2 | 2 layer, port 7-8, $n_{SCID} = 0$ (OCC = 4) |
| 3 | 1 layer, port 8, $n_{SCID} = 1$ (OCC = 2) | 3 | 2 layer, port 7-8, $n_{SCID} = 1$ (OCC = 4) |
| 4 | 1 layer, port 7, $n_{SCID} = 0$ (OCC = 4) | 4 | 2 layer, port 11, 13, $n_{SCID} = 0$ (OCC = 4) |
| 5 | 1 layer, port 7, $n_{SCID} = 1$ (OCC = 4) | 5 | 2 layer, port 11, 13, $n_{SCID} = 1$ (OCC = 4) |
| 6 | 1 layer, port 8, $n_{SCID} = 0$ (OCC = 4) | 6 | 3 layer, port 7-9 |
| 7 | 1 layer, port 8, $n_{SCID} = 1$ (OCC = 4) | 7 | 4 layer, port 7-10 |
| 8 | 1 layer, port 11, $n_{SCID} = 0$ (OCC = 4) | 8 | 5 layer, port 7-11 |
| 9 | 1 layer, port 11, $n_{SCID} = 1$ (OCC = 4) | 9 | 6 layer, port 7-12 |
| 10 | 1 layer, port 13, $n_{SCID} = 0$ (OCC = 4) | 10 | 7 layers, ports 7-13 |
| 11 | 1 layer, port 13, $n_{SCID} = 1$ (OCC = 4) | 11 | 8 layers, ports 7-14 |
| 12 | 2 layers, ports 7-8 | 12 | Reserved |
| 13 | 3 layers, ports 7-9 | 13 | Reserved |
| 14 | 4 layers, ports 7-10 | 14 | Reserved |
| 15 | Reserved | 15 | Reserved |

Based on Table 5 or Table 6, the terminal may determine the number of allocated layers, the RE mapping, and the RS sequence corresponding to the PDSCH transmission through the DCI indicated by the BS, estimate the precoded channel, and decode the PDSCH. Here, When PMI/RI reporting is not configured, the corresponding DMRS is always decoded under the assumption that the same precoding is applied in only one RB. When PMI/RI reporting is configured, it is determined that the same precoding is used within a precoding resource block group (PRG). The PRG unit varies in size according to the system bandwidth set for the terminal as shown below in Table 7.

TABLE 7

| System Bandwidth ($N_{RB}^{DL}$) | PRG Size (P') (PRBs) |
|---|---|
| ≤10 | 1 |
| 11-26 | 2 |
| 27-63 | 3 |
| 64-110 | 2 |

In LTE, for channel estimation for data decoding using the DMRS, channel estimation is performed within the PRG (bundling unit) using PRB bundling associated with the system bandwidth. In the time unit, channel estimation is performed under the assumption that the same precoding is applied to the DMRS in only one TTI.

Hence, unlike the CRS, since the use in the time and frequency domain is limited, estimation performance of the DMRS is lower than that of the CRS. Such DMRS channel estimation performance may be a serious problem in the NR system. Therefore, a method for improving channel estimation performance of the DMRS is required in the NR system.

Figure 4:
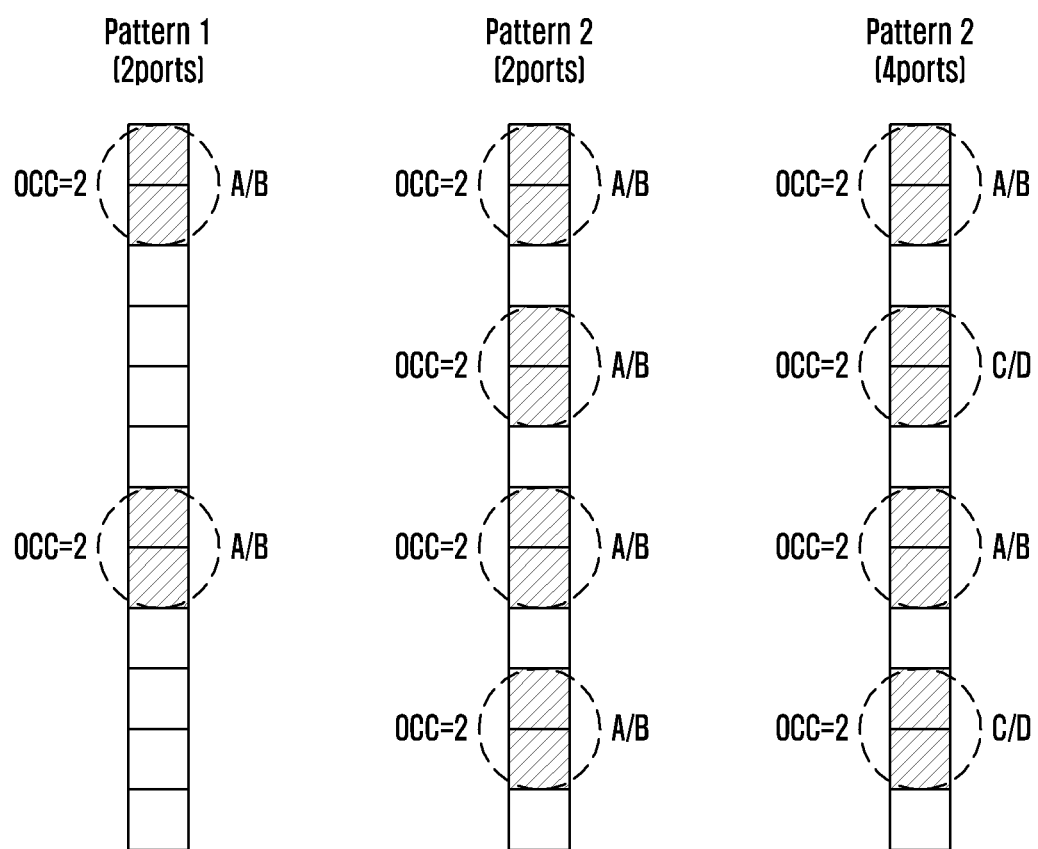
FIG. 4 illustrates demodulation RS (DMRS) assignment that can be supported by a new radio (NR) system.

FIG. 4 illustrates DMRS assignment that can be supported by an NR system according to an embodiment of the present disclosure.

Referring to FIG. 4, the BS allocates the DMRS based on one OFDM symbol. To minimize the time required for the terminal to decode data sent by the BS and transmit an ACK or NACK for the data, a front-loaded DMRS structure in which the DMRS symbol is located only in the first half of the data transmission can be supported. In this case, since DMRS transmission is not performed after the first symbol, the accuracy of the DMRS is lowered, and it is necessary to improve the performance of DMRS channel estimation.

To this end, the configuration for the PRG can be introduced in the NR system. In the NR system, the CSI reporting configurations, RS configurations, and CSI measurement configurations can be used as follows.

TABLE 8

- CSI-related settings consisting of:
  CSI reporting settings
  - CSI parameter can be independently configured, e.g. time and/or frequency granularity, FFS: ON/OFF
    - FFS: Details of configurability
  - Definition of CSI parameters (e.g., CQI, PMI,RI) is FFS
  - RS (at least for CSI measurement) settings, e.g. CSI-RS (CSI-IM as a special case)
    - FFS: Other RS for CSI measurement
  - CSI measurement settings
    - To configure which RS setting is used for a particular CSI reporting setting As described above, although the use of PRB bundling is configured using the PMI/RI reporting configurations in the existing LTE system, it is possible to support PRB bundling configurations independent of the transmission parameter configurations to operate along with the flexible CSI reporting configurations, RS configurations and CSI measurement configurations shown above in Table 8. In an embodiment of the present disclosure, transmission parameter sets can be used as shown below in Table 9.

TABLE 9

- Transmission parameter set 1: parameters configured (FFS: L1 or L2 or L3)
  - For default transmission scheme, specify default values of parameters in the Transmission parameter set 1
    - FFS: Whether default value can be derived implicitly
  - Note that depending on parameter settings in transmission parameter set 1, the size of transmission parameter set 2, i.e. DCI size, may vary.
- Transmission parameter set 2: parameters indicated by physical layer (e.g. NR PDCCH channel)
  - FFS whether multiple subsets is supported and how to simplify DCI format As described above, there may be transmission parameter set 1 based on configurations and transmission parameter set 2 indicated dynamically. Here, to support such PRB bundling configurations, transmission parameter set 1 may include a parameter related to the PRB bundling size. These parameters may support all or some of the following configurable items.

PRB bundling configuration 1: PRB bundling is not supported, and DMRS channel estimation and data decoding are performed on the assumption that the transmission precoding is the same in one PRB.

PRB bundling configuration 2: PRB bundling is supported, and the PRB bundling size is fixed according to the system bandwidth.

PRB bundling configuration 3: PRB bundling is supported, and the PRB bundling size is set via higher layer signaling or dynamic signaling (DCI, media access control (MAC) control element (CE)) from the BS.

PRB bundling configuration 4: PRB bundling is supported based on the system bandwidth or the entire bandwidth (wideband) set for the terminal.

In PRB bundling configuration 1, PRB bundling is not supported. When a specific condition is satisfied (the terminal operates using time division duplex (TDD), or the BS and the terminal each use the same antenna for transmission and reception), the BS can identify the downlink channel state through uplink information estimated using a sounding RS (SRS) transmitted by the terminal. This behavior is called channel reciprocity. In this case, even if the terminal does not transmit beam direction information of the downlink channel to the BS, the BS can obtain beam direction information for all bands. Therefore, the BS can transmit data to the terminal using a beam whose direction changes for each PRB in which data is transmitted. To this end, PRB bundling may not be supported.

In PRB bundling configuration 2, the PRB bundling size is fixed according to the system bandwidth. This may lower the implementation complexity of the terminal for PRB bundling and improve DMRS channel estimation performance through PRB bundling. When channel reciprocity is not available, the terminal may report channel direction information for the entire bandwidth or each subband. This is because, when channel direction information is reported for all PRBs, the degree of performance improvement is small compared to the overhead required for the terminal to report. As such, the terminal reports direction information based on the minimum subband, and accordingly, the same precoding is applied for each minimum subband. In this case, it is possible to perform channel estimation throughout several PRBs having the same precoding, thereby improving channel estimation performance. Here, the PRG size corresponding to the system bandwidth may be the same as the size of the subband or resource block group (RBG).

In PRB bundling configuration 3, the PRB bundling size is set via higher layer signaling or dynamic signaling. Although the implementation complexity of the terminal for PRB bundling is relatively higher than PRB bundling configuration 2, PRB bundling configuration 3 may improve the DMRS channel estimation performance by flexibly adjusting PRB bundling according to determination of the BS. In this setting, the on/off of dynamic signaling can be achieved based on 1-bit higher layer signaling (or on/off signaling). When set to "on", the PRG size can be indicated by using the PRB bundling size predefined in the standard. Table 10 below illustrates these predefined PRB bundling sizes.

TABLE 10

| DCI bit | PRG Size |
| --- | --- |
| 0 | 1 PRB (No PRB bundling) |
| 1 | 2 PRBs |
| 2 | 3 PRBs |
| 3 | 4 PRBs |

Specifically, when the dynamic PRB bundling configuration is set to "on" through higher layer signaling, the terminal may receive a PRG size indication through DCI signaling from the BS. For example, with reference to Table 10, 2-bit DCI signaling may be used, if 2 is indicated, the PRG size with three PRBs is used, and if 0 is indicated, PRB bundling is not supported.

When PRB bundling configuration 3 is used as described above, one PRG size is set and PRB bundling can be supported based on the PRG size. Here, there may be pre-configurable values as shown in Table 10 and these values can be indicated through higher layer signaling.

Meanwhile, two or more values may be set for PRB bundling configuration 3 and the set values may be indicated through dynamic signaling of the BS. For example, with reference to Table 10, when the PRG size is set along with one PRB bundling size of 3 PRBs and another PRB bundling size of 4 PRBs, the BS may dynamically notify this to the terminal. Here, if PRB bundling configuration 1 is used, the 1-PRB based configuration may not be needed. Hence, in addition to Table 10, a configuration table as shown in Table 11 below may be used.

TABLE 11

| DCI bit | PRG Size |
| --- | --- |
| 0 | 2 PRBs |
| 1 | 3 PRBs |
| 2 | 4 PRBs |
| 3 | 6 PRBs |

Alternatively, PRB bundling configuration 1 may not be used when an entry of 1 PRB (PRB bundling not supported) exists as shown in Table 10 in PRB bundling configuration 3.

Further, only PRB bundling configuration 3 may be supported among the above PRB bundling configurations. As PRB bundling configuration 3 can support PRB bundling configurations 1, 2 and 4 through dynamic or higher layer signaling, the terminal may always use PRB bundling configuration 3 and may receive the corresponding PRG size from the BS through RRC or dynamic signaling.

Additionally, the system bandwidth or the entire bandwidth assigned to the terminal may be included as a PRB bundling size in Table 10 and Table 11 as in PRB bundling configuration 4.

In PRB bundling configuration 4, PRB bundling is supported so that the system bandwidth or the entire bandwidth assigned to the terminal is set as a PRG size. Under the assumption that the same precoding is applied to the system bandwidth or the entire bandwidth assigned to the terminal, the implementation of the channel estimator of the terminal is simplified. To this end, the BS may support wideband precoding. When PRB bundling is configured based on wideband precoding, the terminal may perform estimation under the assumption that the same precoding is applied to the entire bandwidth assigned to the terminal.

Figure 5:
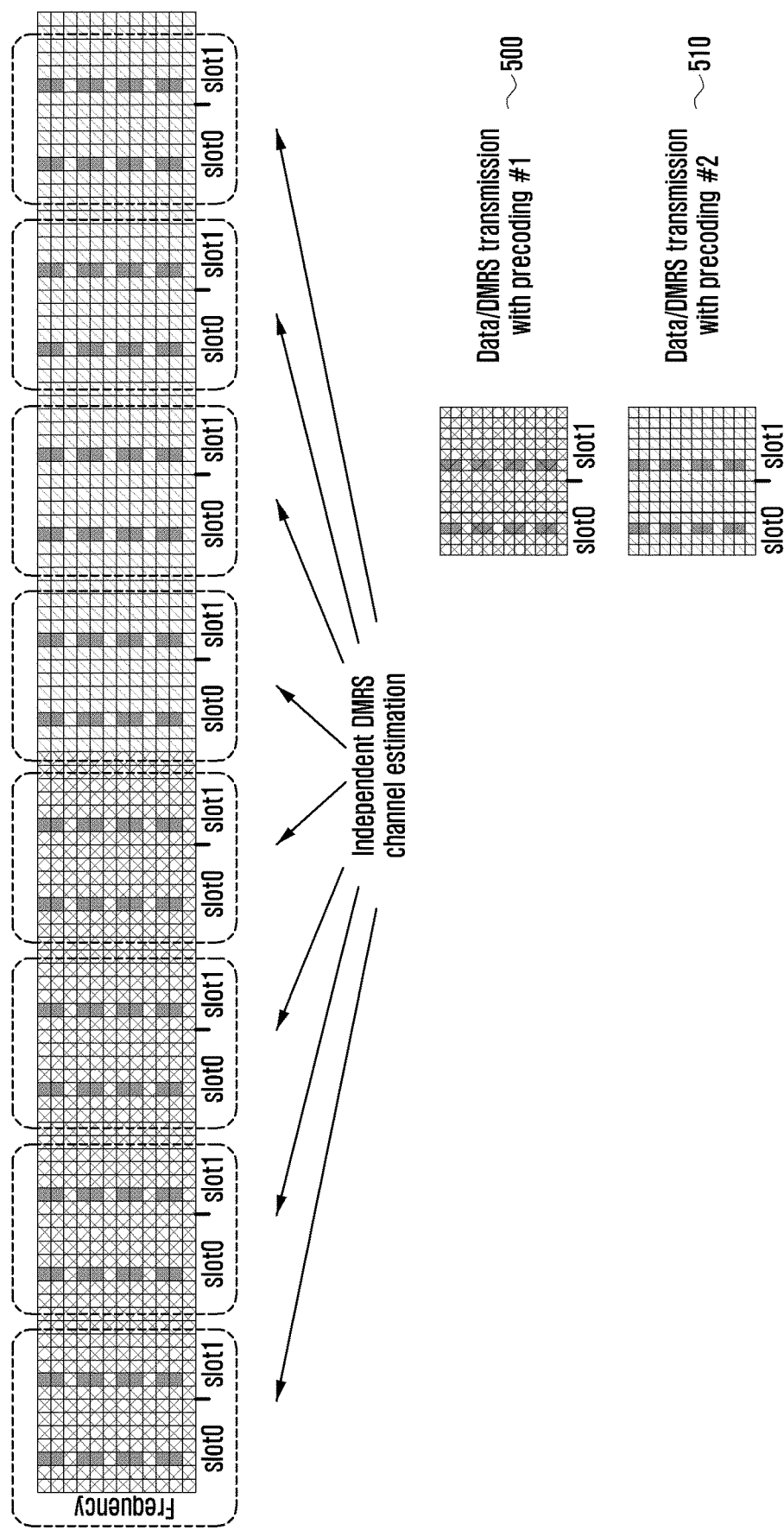
FIG. 5 illustrates a case where an existing DMRS channel estimation scheme is applied to an expected NR DMRS structure according to an embodiment of the present disclosure.

FIG. 5 illustrates a case where an existing DMRS channel estimation scheme is applied to an expected NR DMRS structure according to an embodiment of the present disclosure.

Referring to FIG. 5, each DMRS and data are transmitted using precoding #1 (500) or precoding #2 (510). The channel status reporting by the terminal occurs periodically or occurs only when there is an indication from the BS, and the precoding applied to the DMRS and data is not frequently switched. However, because channel estimation for the DMRS and data is performed based on a single TTI, though the terminal receives the DMRS and data using the same precoding, it cannot improve the channel estimation performance by simultaneously using the DMRSs.

Figure 6:
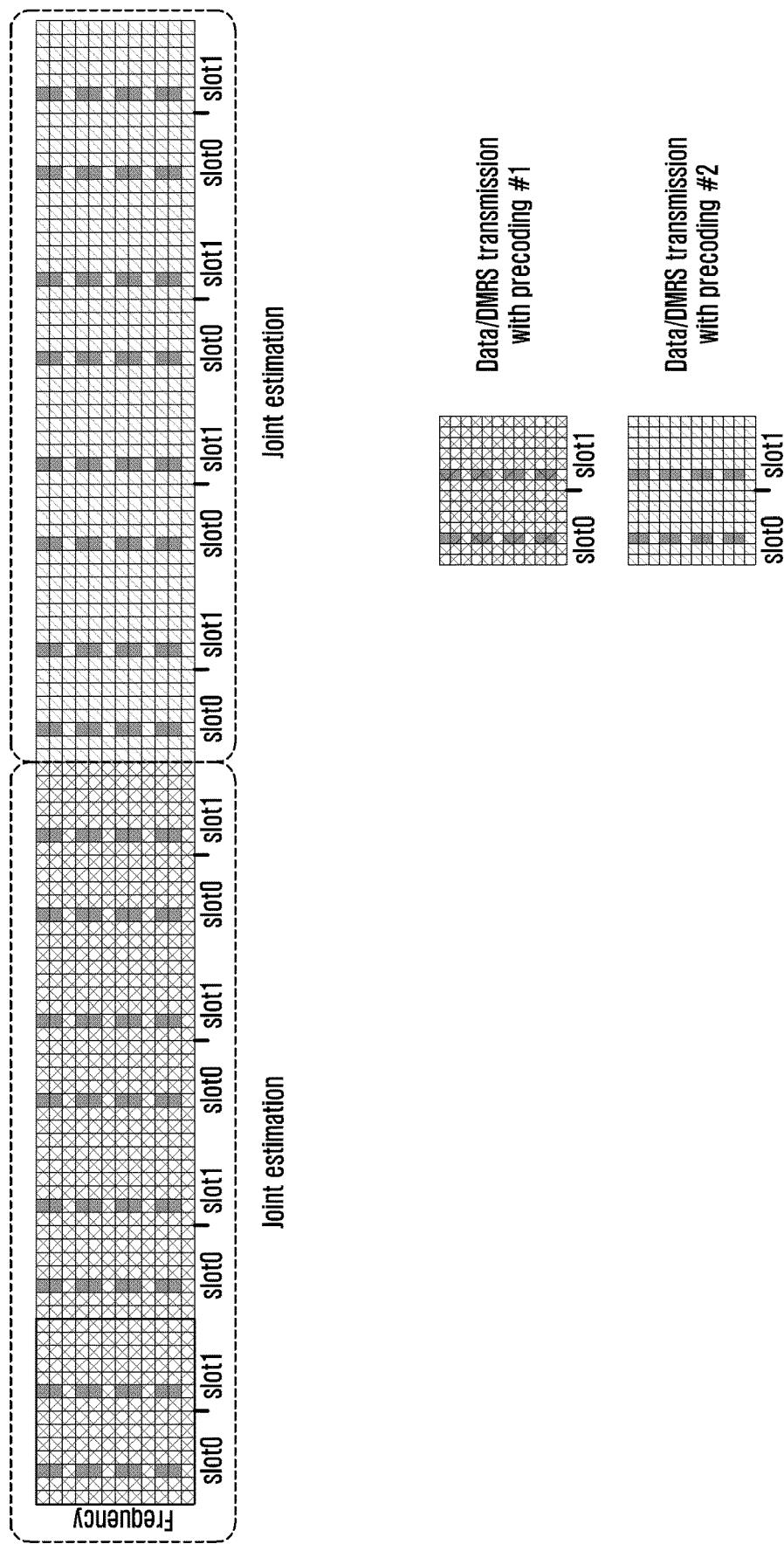
FIG. 6 illustrates a method of joint DMRS estimation in transmission utilizing same precoding for multiple transmission time intervals (TTIs) according to an embodiment of the present disclosure.

FIG. 6 illustrates a method of joint DMRS estimation in transmission utilizing same precoding for multiple TTIs according to an embodiment of the present disclosure.

Referring to FIG. 6, the terminal may be notified by the BS whether the same precoding is applied. Based on this notification, the terminal can increase DMRS channel estimation performance by performing estimation simultaneously using the DMRSs to which the same precoding is applied.

This method may be distinguished from the case of repeated transmission for coverage enhancement used in mMTC in that the data and scheduling interval may be different. In mMTC of the LTE system, to expand the coverage, the RS and data corresponding to one OFDM symbol are repeatedly transmitted using four symbols. Here, because the same data is repeated for transmission at the same timing, the precoding applied to the RS and data is the same and the actually transmitted data is the same. In contrast, to improve DMRS channel estimation performance, the proposed method estimates the channel using DMRSs together even when the actual time and frequency resources and transmitted data are different.

The following schemes are possible to indicate whether the same precoding is used.

Scheme 1 for indicating whether the same precoding is used: Indicates the time interval during which the same precoding is used via a fixed number or RRC configuration. Channel estimation is performed under the assumption that the same precoding is used for the DMRS and data transmission in the corresponding time interval.

Scheme 2 for indicating whether the same precoding is used: Indicates that the same precoding is used via a 1-bit DCI indication.

Scheme 3 for indicating whether the same precoding is used: Indicates that the same precoding is used via a multi-bit DCI indication.

Scheme 4 for indicating whether the same precoding is used: Indicates that the same precoding is used via a transmission parameter.

Scheme 5 for indicating whether the same precoding is used: Indicates that the same precoding is used via an indicated parameter related to channel state reporting.

Scheme 6 for indicating whether the same precoding is used: When a plurality of subframes, slots or mini slots are scheduled at one time, it is assumed that the same precoding is used in the corresponding interval.

Scheme 7 for indicating whether the same precoding is used: When time or frequency resources for data are continuously allocated to one terminal, it is assumed that the same precoding is used.

A detailed description is given of scheme 1 for indicating whether the same precoding is used. In scheme 1, the time interval during which the same precoding is used is notified via a fixed number or RRC configuration, and channel estimation is performed under the assumption that the same precoding is used for the DMRS and data transmission in the corresponding time interval.

Figure 7:
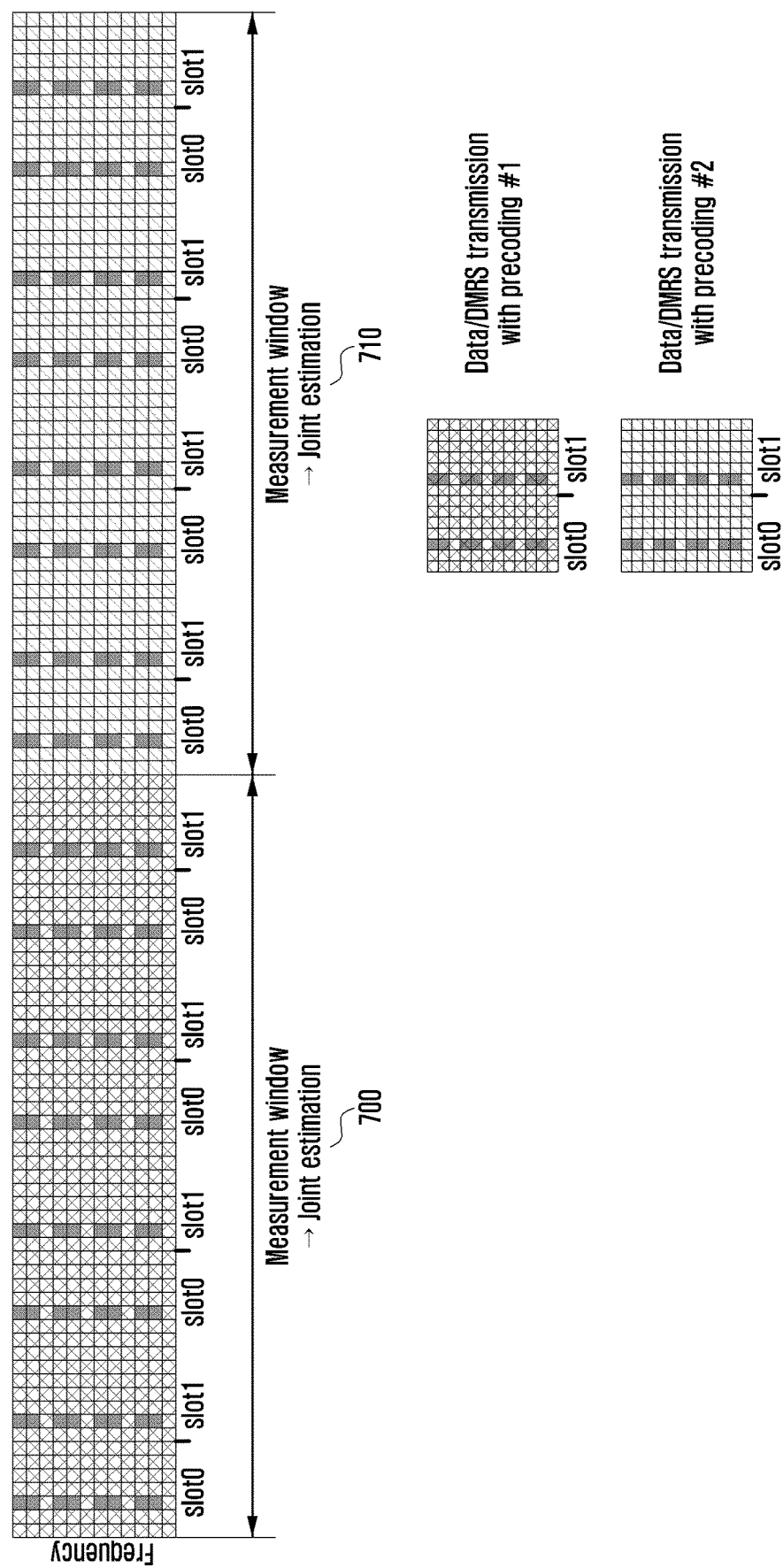
FIG. 7 illustrates a terminal improving channel estimation performance by setting a measurement window according to a first indication scheme according to an embodiment of the present disclosure.

FIG. 7 illustrates a terminal improving channel estimation performance by setting a measurement window according to a first indication scheme according to an embodiment of the present disclosure.

Referring to FIG. 7, the measurement window 700 or 710 may be determined according to a specific value defined in the standard. For example, the value may correspond to a plurality of subframes, slots or TTIs (2 or 3 subframes, 2 or 3 slots, or 2, 3 or 4 TTIs). In this case, if $K \bmod N=I$ is satisfied according to the corresponding subframe, slot, or TTI index, the terminal may be aware that the applied precoding is changed. Here, K indicates the index of the subframe, slot, or TTI, N indicates the length of the measurement window based on the subframe, slot, or TTI, and I indicates the offset and may be zero if no offset is required.

Such a value may vary depending on the system bandwidth assigned to the terminal, the type of service (e.g., enhanced mobile broadband (eMBB), ultra reliable low-latency communication (URLLC), massive machine-type communication (mMTC)) provided to the terminal, and the transmission and channel state reporting technique (open-loop, closed-loop, space frequency block codes (SFBC), precoder cycling, precoding). Alternatively, the continuous precoding of the present disclosure may be used only for a specified service type and transmission and channel state reporting technique.

In addition, the measurement window of FIG. 7 may be configured based on an RRC configuration. It is possible to set both N and I through the RRC, or to set N only through the RRC with I fixed to 0.

In scheme 2 for indicating whether the same precoding is used, usage of the same precoding is notified via a 1-bit DCI indication.

Figure 8:
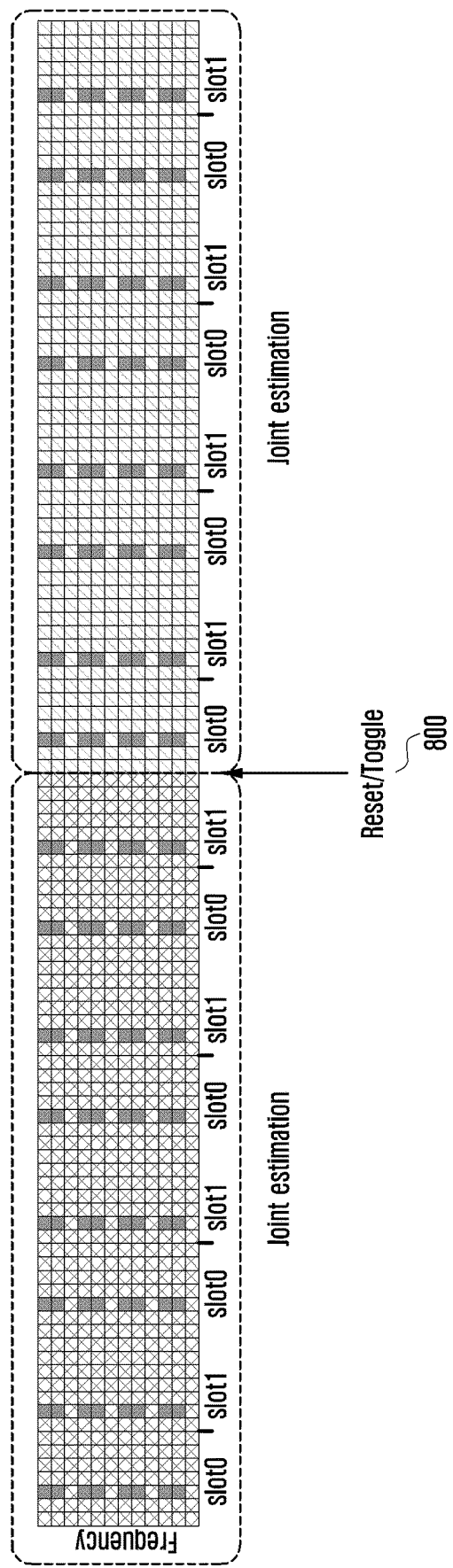
FIG. 8 illustrates a DMRS estimation of a terminal according to a second indication scheme according to an embodiment of the present disclosure.

FIG. 8 illustrates a DMRS estimation of a terminal according to a second indication scheme according to an embodiment of the present disclosure.

Referring to FIG. 8, the BS notifies the terminal that the same precoding is used for the corresponding DMRS and data transmission through a 1-bit DCI. Here, 1-bit resetting (toggling) may indicate whether the same precoding is used. For example, a DCI value of 0 may indicate usage of the same precoding, and a DCI value of 1 may indicate usage of new precoding (reset). After the BS transmits the DMRS and data using precoding #1, it may recognize the necessity of applying new precoding #2 and notifies this to the terminal by resetting (800). The terminal recognizes that the precoding for the data and DMRS has changed since the reset and does not perform joint DMRS channel estimation. Thereafter, if the same precoding is applied again, the BS may notify the terminal of a DCI value of 0.

This operation can also be indicated through a toggle operation of the terminal. For example, the terminal may indicate a bit of 0 when transmitting the data and DMRS using precoding #1. Thereafter, if precoding #2 is used according to the need for a precoding change, the bit may be changed to 1 (800) and then kept at 1 until an additional precoding change is needed.

Another scheme is to directly indicate precoding sets #1 and #2 through 0 and 1.

Figure 9:
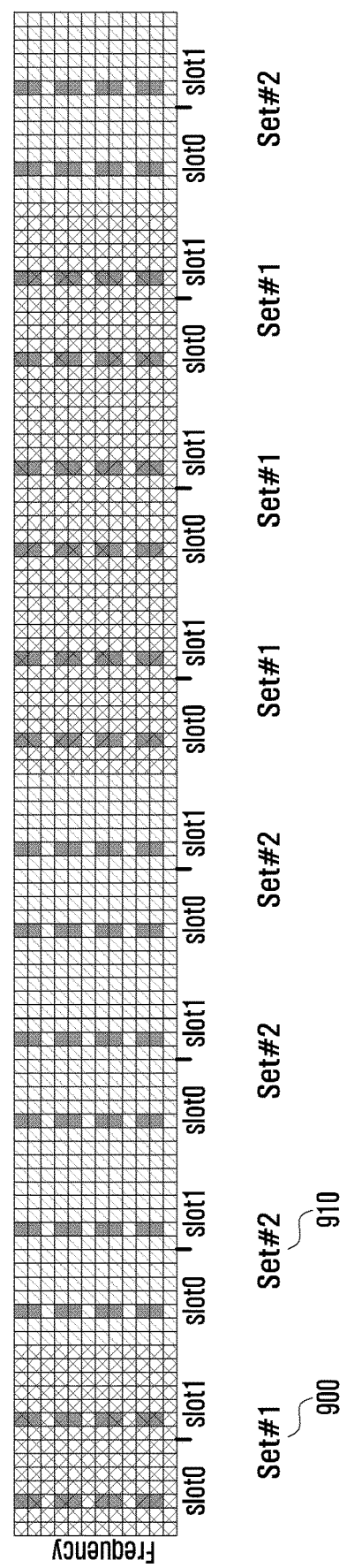
FIG. 9 illustrates a DMRS estimation of a terminal according to a direct indication scheme according to an embodiment of the present disclosure.

FIG. 9 illustrates a DMRS estimation of a terminal according to a direct indication scheme according to an embodiment of the present disclosure.

Referring to FIG. 9, the terminal may be notified of a precoding set for subframes, slots, mini slots, or TTIs through a 1-bit indication (e.g., set #1 (900) and set #2 (910) may be directly indicated). For the resources of the same set, the UE may recognize that the DMRS and data are transmitted using the same precoding and perform joint DMRS channel estimation to improve channel estimation performance. While the reset and toggle based scheme can only be used for continuous precoding with respect to a single terminal, this method may also be used for discontinuous precoding sets. However, this method requires a reset indication because a precoding set can be indicated but a precoding change cannot be indicated. For example, if a DCI value of 1 (indicating a reset) is notified, the indicated precoding set no longer uses the same precoding but uses new precoding.

In scheme 3 for indicating whether the same precoding is used, a multi-bit DCI indication indicates whether the same precoding is applied. When plural bits are used for indication, more precoding sets can be indicated compared with a 1-bit indication.

Figure 10:
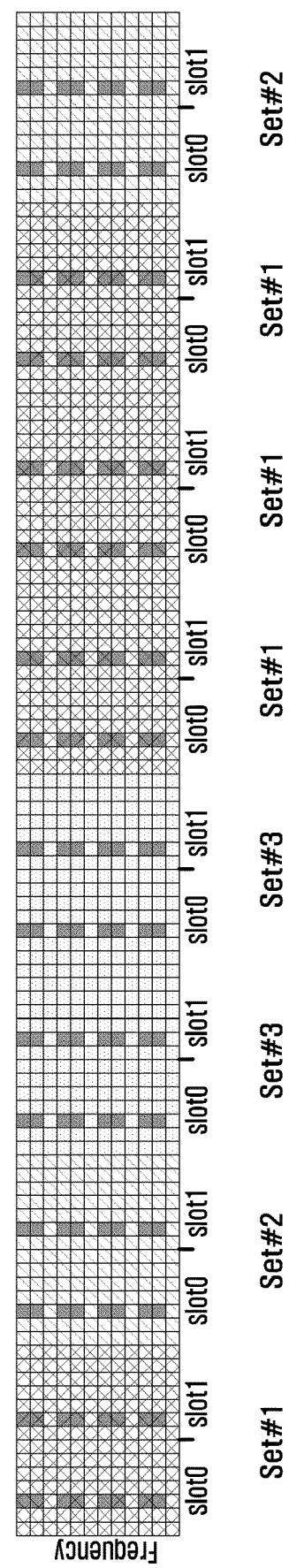
FIG. 10 illustrates a precoding set indication based on a third indication scheme according to an embodiment of the present disclosure.

FIG. 10 illustrates a precoding set indication based on a third indication scheme according to an embodiment of the present disclosure.

Referring to FIG. 10, Tables 12 and 13 below illustrate an indication table for indicating precoding sets through 2-bit indications as an instance for multi-bit DCI indication.

TABLE 12

| Value of field | Description |
|---|---|
| '00' | Precoding set #0 |
| '01' | Precoding set #1 |
| '10' | Precoding set #2 |
| '11' | Precoding set #3 |

TABLE 13

| Value of field | Description |
|---|---|
| '00' | Reset |
| '01' | Precoding set #0 |
| '10' | Precoding set #1 |
| '11' | Precoding set #2 |

As this multi-bit indication scheme can indicate various precoding sets, it may be useful for transmission scenarios, such as coordinated multi-point transmission (CoMP) where multiple transmission points (TPs) and transmission technologies are supported. Table 12 above indicates individual precoding sets as in the case of indication scheme 2. Based on this indication, the terminal can recognize the precoding set on which the transmitted DMRS and data are based and combine corresponding DMRS transmissions to improve DMRS channel estimation performance. Here, as described before in relation to indication scheme 2, an additional DCI indication may be required to reset the corresponding precoding set.

Table 13 illustrates addition of a reset item to precoding sets indicated by a plurality of bits. This may minimize the use of additional DCI bits while maintaining the DCI coverage by designating one item of the indication table as a reset item rather than using additional DCI bits for a reset.

In scheme 4 for indicating whether the same precoding is used, transmission parameters described in Table 9 are used to indicate whether the same precoding is applied.

In the NR system, parameters for data and DMRS transmission are notified to the terminal by using transmission parameter set 1 that can be set in advance via layer 1 (L1), L2 or L3, and transmission parameter set 2 indicated through the DCI. Transmission parameter set 1 may preset various information, such as the transmission scheme (e.g., closed-loop, open-loop, transmit diversity, SFBC, precoding, precoder cycling), the DMRS structure and port count (e.g., DMRS indication table for SU-MIMO or MU-MIMO). Multiple instances of transmission parameter set 1 may be used. Instances of transmission parameter set 1 may be directly (one-on-one) indicated using indication bits or indirectly indicated using parameter set IDs. Transmission parameter set 2 may dynamically indicate transmission parameter set 1 to support corresponding transmission.

Here, to support precoding sets, it is possible to set precoding sets using transmission parameter set 2 (e.g., precoding set #0, precoding set #1, and the like), or, when the same parameter set is dynamically indicated, the terminal may perform joint DMRS channel estimation by assuming that the same precoding is used. Here, similarly to indication scheme 3, it may be necessary to provide an additional reset bit through the DCI for resetting continuous precoding.

In scheme 5 for indicating whether the same precoding is used, an indicated parameter related to channel state reporting described in Table 8 is used to indicate whether the same precoding is used.

In the existing LTE system, the CSI process is used to package such configurations together. However, in the NR system, these configurations can be flexibly combined.

Figure 11:
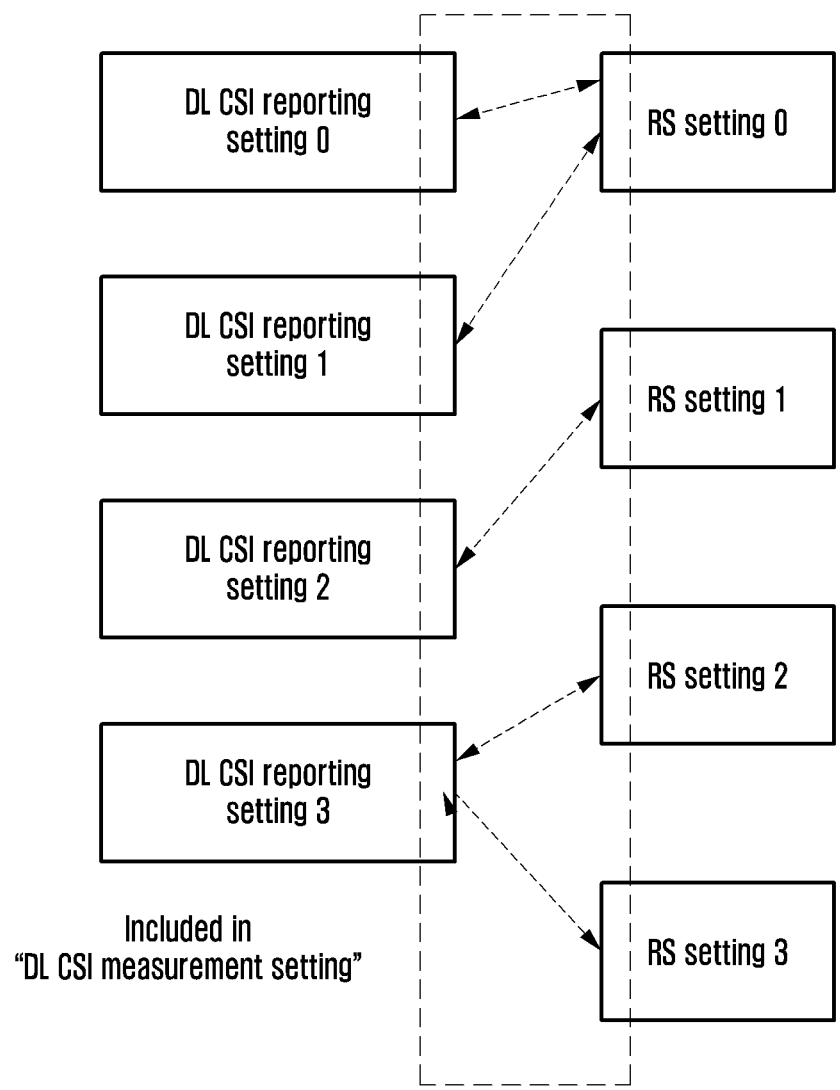
FIG. 11 illustrates a combination of channel state reporting configuration and (an RS) configuration according to an embodiment of the present disclosure.

FIG. 11 illustrates a combination of channel state reporting configuration and an RS configuration according to an embodiment of the present disclosure.

Referring to FIG. 11, CSI reporting configurations and RS configurations can be freely combined by CSI measurement configurations and be notified to the terminal for channel state reporting. To improve the channel estimation performance of the DMRS, the CSI reporting configurations, RS configurations, and CSI measurement configurations can be used for QCL indication to identify Doppler and delay characteristics of the channel. For example, when the CSI reporting configuration is notified to the terminal together with the downlink data scheduling information, the downlink scheduling information indicated by the CSI reporting configuration is used for the corresponding DMRS estimation along with channel delay and Doppler characteristics determined through the CSI-RS, beam RS, and mobility RS used for the corresponding CSI reporting configuration. Similarly, when the RS configuration is indicated, the terminal may identify the delay and Doppler-related characteristics of the channel in the corresponding RS transmission and use the same for DMRS estimation, and when the CSI measurement configuration is indicated, the terminal can use the RS and reporting related characteristics obtained for the corresponding CSI measurement configuration to identify delay and Doppler related characteristics. Further, when the same CSI report configuration, RS configuration, or CSI measurement configuration is indicated, the terminal can estimate the DMRS channel by assuming that the same precoding is applied to all the DMRSs transmitted using the same configuration. Here, a reset bit for resetting the precoding information may be necessary as in the case of indication schemes 4 and 5.

In scheme 6 for indicating whether the same precoding is used, when a plurality of subframes, slots or mini slots are scheduled at one time, it is assumed that the same precoding is used in the corresponding interval.

Figure 12:
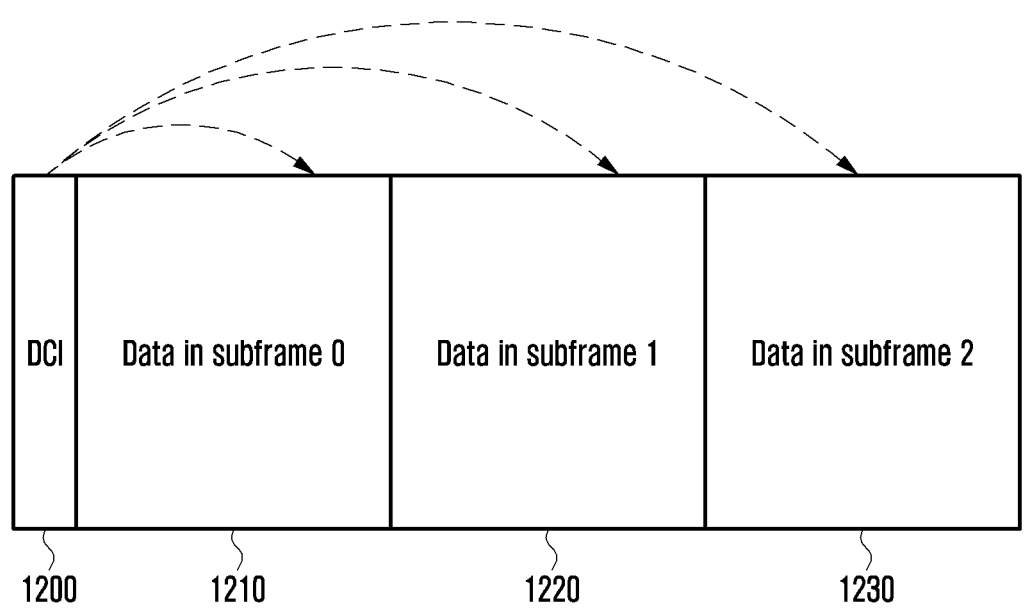
FIG. 12 illustrates scheduling of multiple subframes through one downlink control information (DCI) according to an embodiment of the present disclosure.

FIG. 12 illustrates scheduling of multiple subframes through one downlink control information (DCI) according to an embodiment of the present disclosure.

Referring to FIG. 12, in the existing LTE system, one DCI 1200 may schedule only one subframe or TTI. However, in the NR system, as shown in FIG. 12, a case is considered where multiple subframes, slots or mini slots (1210, 1220, and 1230) are scheduled at one time. In such a case, the BS cannot obtain new channel state information for the subframe, slot or mini slot at the time of scheduling, and therefore it is natural to use the same precoding for the subframes, slots or mini slots scheduled at one time. In this case, the terminal can improve DMRS estimation performance by performing DMRS estimation under the assumption that the same precoding is applied.

In scheme 7 for indicating whether the same precoding is used, when time or frequency resources for data are continuously allocated to one terminal, it is assumed that the same precoding is applied.

Figure 13:
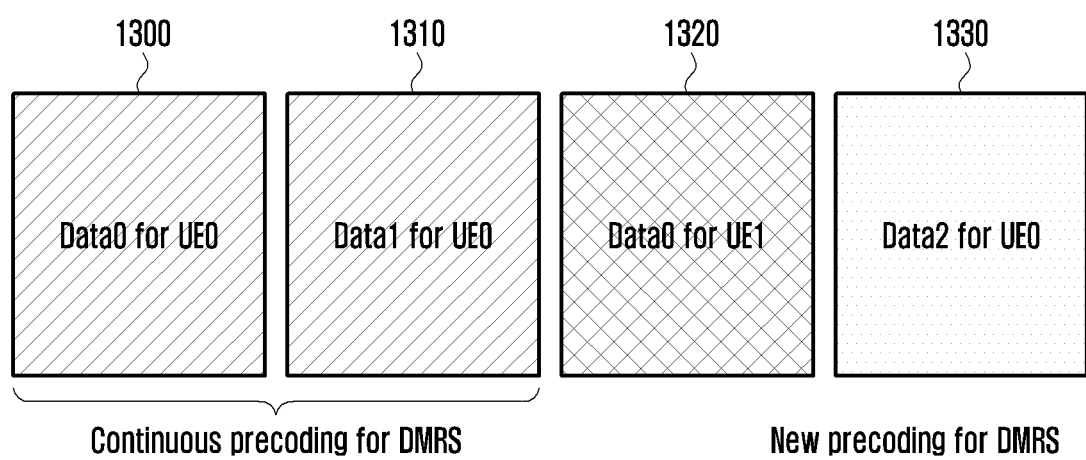
FIG. 13 illustrates notifying of a terminal of usage of same precoding through continuous scheduling in time resources according to an embodiment of the present disclosure.

FIG. 13 illustrates notifying of a terminal of usage of same precoding for DMRS and data transmission through continuous scheduling in time resources according to an embodiment of the present disclosure.

Referring to FIG. 13, UE 0 is scheduled to receive data continuously in the first and second TTIs 1300 and 1310. In this case, UE 0 may assume that continuous precoding is used and improve estimation performance by performing joint DMRS estimation. In the third TTI 1320, UE 1 is scheduled. Hence, in the fourth TTI 1330 scheduled for UE 0, DMRS channel estimation is separately performed under the assumption that a different precoding is used.

Figure 14:
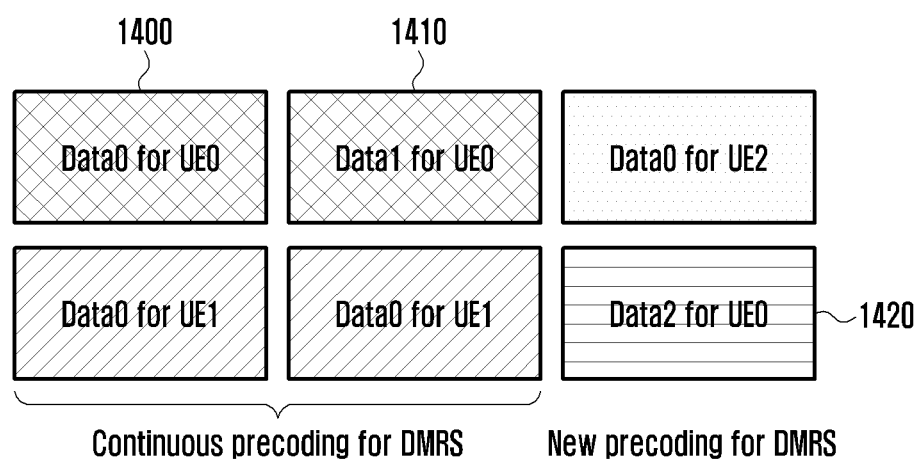
FIG. 14 illustrates notifying of a terminal of usage of same precoding through continuous scheduling in time and frequency resources according to an embodiment of the present disclosure.

FIG. 14 illustrates notifying of a terminal of usage of same precoding for DMRS and data transmission through continuous scheduling in time and frequency resources according to an embodiment of the present disclosure.

Referring to FIG. 14, UE 0 is scheduled continuously in frequency resources to receive data in the first and second TTIs 1400 and 1410. In this case, UE 0 may assume that continuous precoding is used and improve estimation performance by performing joint DMRS estimation. In the third TTI, UE 0 is scheduled using a different resource 1420. Hence, UE 0 may separately perform DMRS channel estimation under the assumption that a different precoding is used from the third TTI. In FIGS. 13 and 14, usage of the same precoding is considered in the time and frequency resources. However, various resources, such as time, frequency, antenna port, and code can be considered for usage of the same precoding.

When the method of joint DMRS estimation proposed in an embodiment of the present disclosure is used, it is necessary to consider the case where the scheduled ranks are different when usage of continuous precoding or the same precoding set is indicated by the BS.

Figure 15:
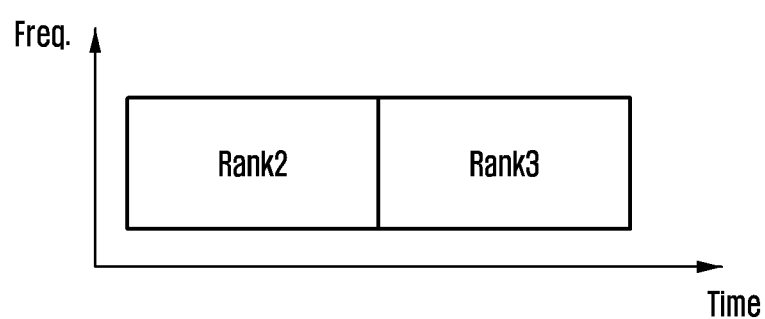
FIG. 15 illustrates a case where scheduled ranks are different according to an embodiment of the present disclosure.

FIG. 15 illustrates a case where scheduled ranks are different according to an embodiment of the present disclosure.

Referring to FIG. 15, the terminal is notified of different ranks in different TTIs. In this case, as the number of DMRS antenna ports needed to decode the data is different, the terminal may have difficulty in performing joint DMRS channel estimation by assuming usage of continuous precoding.

A first option to address this issue is to recognize a change in the rank as a reset without continuous precoding. A second option is to use continuous precoding only for the minimum rank. In the codebook of the existing LTE system, {rank 1, rank 2}, {rank 3, rank 4}, and {rank 5, rank 6, rank 7, rank 8} each use the same beams but increase the rank by adding orthogonal beams. Based on this codebook design, it is possible to perform DMRS channel estimation by assuming that the same precoding is used up to the minimum rank (rank2 in FIG. 15) and a new precoding is applied for the subsequent rank. This may improve DMRS channel estimation performance up to the minimum rank.

When the method of joint DMRS estimation proposed in an embodiment of the present disclosure is used, it is also necessary to consider the case where the scheduled frequency resources are different when usage of continuous precoding or the same precoding set is indicated by the BS.

Figure 16:
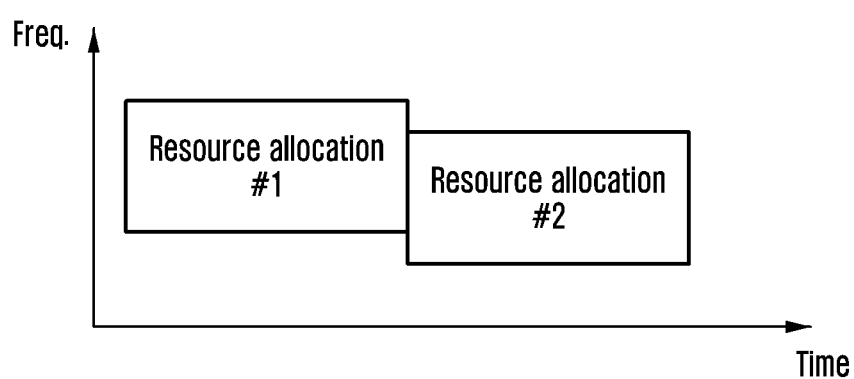
FIG. 16 illustrates a case where frequency resources are different according to an embodiment of the present disclosure.

FIG. 16 illustrates a case where frequency resources are different according to an embodiment of the present disclosure.

Referring to FIG. 16, different frequency resources are scheduled to the terminal in different TTIs. In this case, as the region of the DMRS transmitted for data decoding is different, the terminal may have difficulty in recognizing usage of continuous precoding and performing joint DMRS channel estimation. A first option to address this issue is to recognize a change in the frequency resource as a reset without continuous precoding. A second option is to use continuous precoding only in the region where overlapped scheduling is performed. A third option is to use continuous precoding even for a region where overlapped scheduling is not performed by applying interpolation or extrapolation. Here, the second option and the third option can be used in combination. For example, according to the size of the resource allocated in a non-overlapped manner, the third option can be used if the size is small (for example, when the non-overlapping region is less than X PRBs). Otherwise, the second option may be used.

When the method of joint DMRS estimation proposed in an embodiment of the present disclosure is used, it is necessary to consider the case where the modulation and coding schemes (MCS) used for transmission is changed when usage of continuous precoding or the same precoding set is indicated by the BS.

Figure 17:
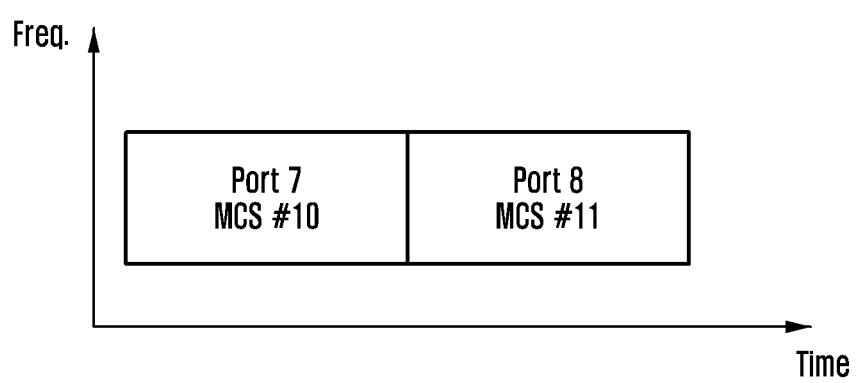
FIG. 17 illustrates a case where a modulation and coding scheme (MCS) is different according to an embodiment of the present disclosure.

FIG. 17 illustrates a case where an MCS is different according to an embodiment of the present disclosure.

Referring to FIG. 17, the terminal is notified of different MCSs in different TTIs. In this case, as the MCS is changed, it may be necessary to use precoding differently for data decoding. A first option to address this issue is to recognize a change in the MCS as a reset without continuous precoding. A second option is to use continuous precoding according to the indication of the BS.

When the method of joint DMRS estimation proposed in an embodiment of the present disclosure is used, although the BS has indicated continuous precoding, the estimation interval that can be jointly estimated may be shorter than that indicated owing to the limitation of the channel estimator of the terminal.

Figure 18:
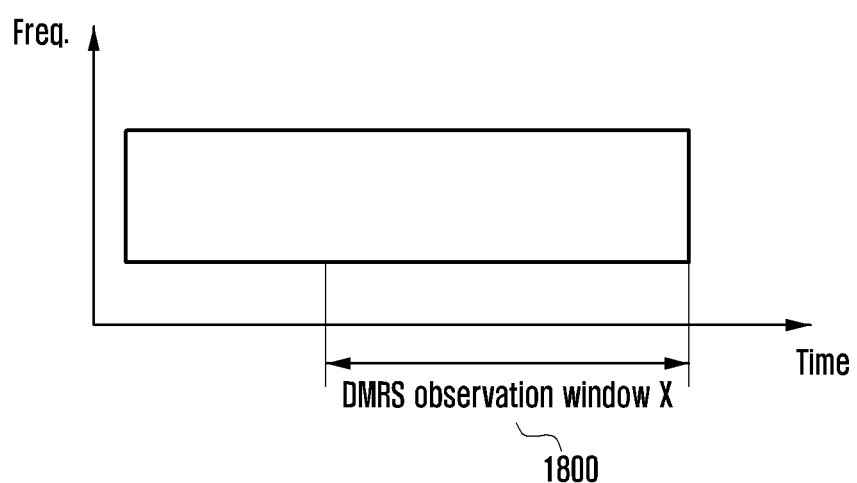
FIG. 18 illustrates an estimation interval shorter than a continuous precoding indication according to an embodiment of the present disclosure.

FIG. 18 illustrates an estimation interval shorter than a continuous precoding indication according to an embodiment of the present disclosure.

Referring to FIG. 18, the terminal cannot estimate the whole interval indicated by the BS for the same precoding at one time owing to the characteristics of the channel estimator thereof. A first option to address this issue is to specify the minimum measurement interval that all terminals must support in advance in the standard. If a terminal meets this minimum requirement, the terminal may utilize a channel estimation method that employs continuous precoding of the DMRS to improve channel estimation performance. A second option is to set the measurement interval by the BS using an RRC configuration. To this end, the UE may report the size of the available measurement window to the BS as a UE capability, and the BS can determine the size of the required measurement window based on the channel state, UE mobility, interference intensity, and the like. A third option is to follow the implementation of the terminal. The UE capability of a UE can be readily recognized by the UE itself, and thus, the UE can select a supportable measurement window although the BS has indicated continuous precoding. This option does not require complicated descriptions in the standard, and can allow various implementations of terminals.

In the description, downlink transmission is assumed where the BS performs scheduling and the terminal performs reception. However, the contents of the present disclosure are also applicable to the uplink where the terminal transmits and the BS receives, or to the side link supporting transmission and reception between terminals.

In addition, although only the DMRS has been mentioned in the description, the present disclosure can be applied to all types of RSs, such as CSI-RS, beam RS, mobility RS and SRS, to improve the estimation performance.

Figure 19:
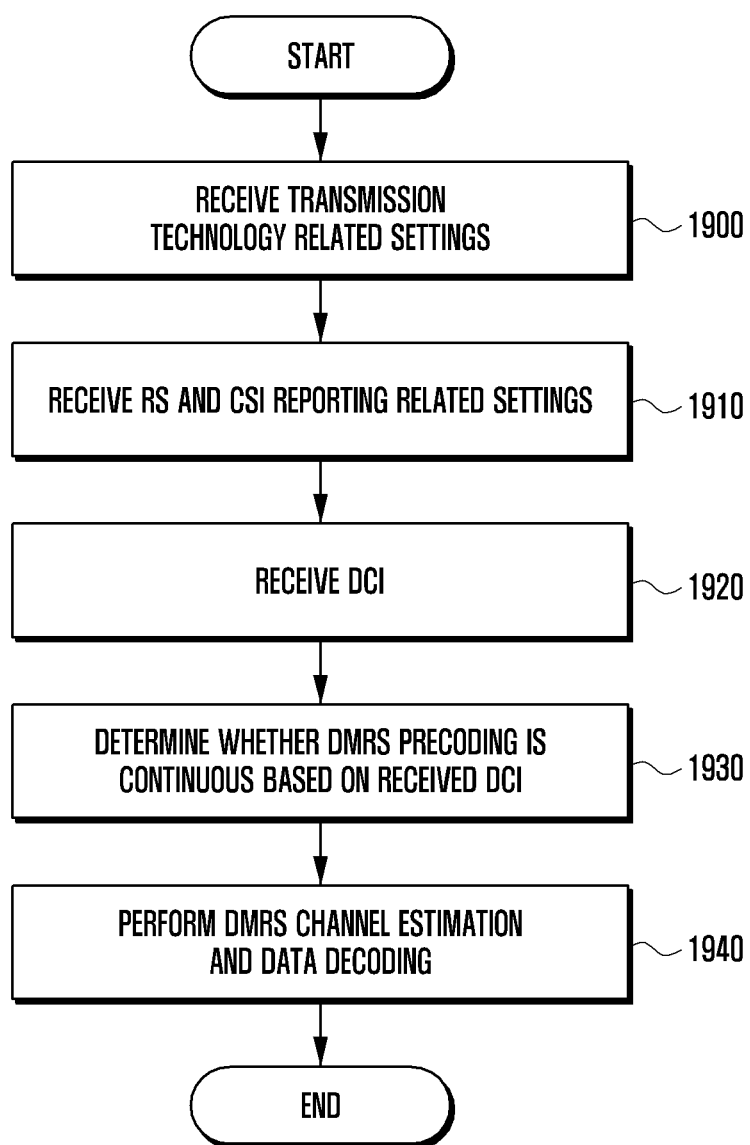
FIG. 19 is a flowchart for an operation procedure of a terminal according to an embodiment of the present disclosure.

FIG. 19 is a flowchart for an operation procedure of a terminal according to an embodiment of the present disclosure.

Referring to FIG. 19, at operation 1900, the terminal receives information related to UE data transmission through RRC or higher layer signaling. Such information may include settings related to the transmission technology (transmit diversity, closed-loop, open-loop, precoder cycling), precoding resource block groups (PRG), and DCI size.

At operation 1910, the terminal receives configuration information related to the CSI-RS and channel state reporting. Such information may include settings for at least one of virtual router group (VRG) related IDs, timing of each VRG, frequency resource location, service type, service set, supported feedback type, and VRG measurement subset. In addition, based on the received configuration information, the terminal can identify at least one of the number of ports for each NP CSI-RS, the number of antennas for each dimension (N1, N2), oversampling factors for each dimension (O1, O2), multiple resource configurations for setting one subframe configuration and location for multiple CSI-RS transmissions, information related to codebook subset restriction, CSI reporting related information, CSI-process index, and transmission power information (PC). At operation 1920, the terminal receives information related to data transmission scheduling and transmission technology through DCI transmitted from the BS. At this time, precoding continuity, precoding sets, transmission technology configurations, CSI measurement configurations, RS configurations, and CSI reporting configurations can be indicated. At operation 1930, the terminal determines whether DMRS precoding is continuously based on the information received at operation 1920. At operation 1940, the UE performs joint channel estimation in the time domain using the DMRS according to whether DMRS precoding is continuous to thereby improve the channel estimation performance, and decodes the data based on the estimated DMRS channel information.

Figure 20:
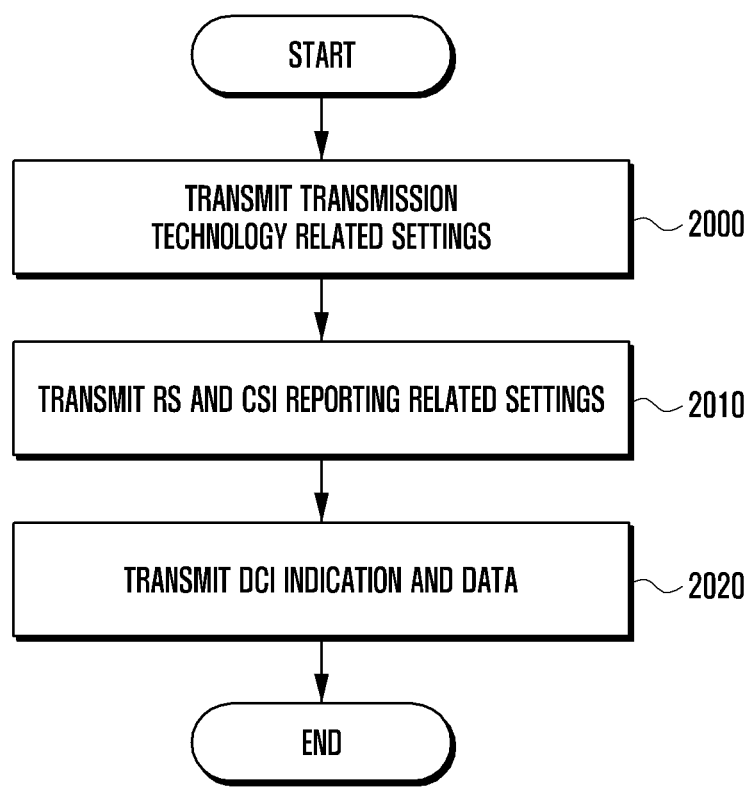
FIG. 20 is a flowchart for an operation procedure of a base station (BS) according to an embodiment of the present disclosure.

FIG. 20 is a flowchart for an operation procedure of a BS according to an embodiment of the present disclosure.

Referring to FIG. 20, at operation 2000, the BS transmits information related to data transmission of the corresponding terminal through RRC or higher layer signaling. Such information may include settings related to the transmission technology (transmit diversity, closed-loop, open-loop, precoder cycling), PRG, and DCI size.

At operation 2010, the BS transmits configuration information related to the CSI-RS and channel state reporting. Such information may include settings for at least one of VRG related IDs, timing of each VRG, frequency resource location, service type, service set, supported feedback type, and VRG measurement subset. In addition, based on the transmitted configuration information, the BS can deliver at least one of the number of ports for each NP CSI-RS, the number of antennas for each dimension (N1, N2), oversampling factors for each dimension (O1, O2), multiple resource configurations for setting one subframe configuration and location for multiple CSI-RS transmissions, information related to codebook subset restriction, CSI reporting related information, CSI-process index, and transmission power information (PC).

At operation 2020, the BS transmits information related to data transmission scheduling and transmission technology through DCI. At this time, precoding continuity, precoding sets, transmission technology configurations, CSI measurement configurations, RS configurations, and CSI reporting configurations can be indicated. This indication to whether DMRS precoding is continuous in the time domain can improve DMRS channel estimation performance of the terminal.

Figure 21:
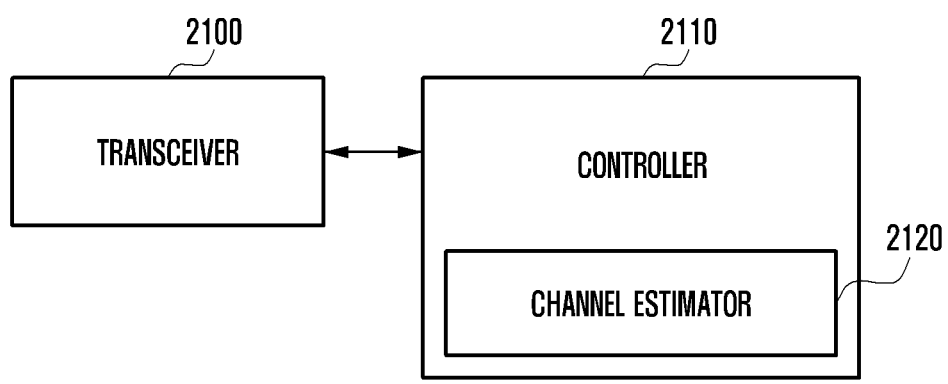
FIG. 21 is a block diagram of a terminal according to an embodiment of the present disclosure.

FIG. 21 is a block diagram of a terminal according to an embodiment of the present disclosure.

Referring to FIG. 21, the terminal includes a transceiver 2100 and a controller 2110. The transceiver 2100 transmits and receives data to and from the outside (e.g., BS). The transceiver 2100 may transmit feedback information to the BS under the control of the controller 2110. The controller 2110 controls states and operations of all the components constituting the terminal. Specifically, according to the information received from the BS, the controller 2110 generates feedback information, estimates the DMRS channel, and decodes data. In addition, according to timing information received from the BS, the controller 2110 controls the transceiver 2100 to feedback the generated channel information to the BS and to receive data assigned to the terminal. To this end, the controller 2110 may include a channel estimator 2120. The channel estimator 2120 determines the location of the corresponding VRG in the time and frequency resources through VRG service and feedback information received from the BS and identifies necessary feedback information through the CSI-RS and feedback allocation information related thereto. The channel estimator 2120 also estimates the channel using DMRS samples of multiple subframes or slots according to the continuity of DMRS precoding. Although the terminal is depicted as including the transceiver 2100 and the controller 2110 in FIG. 21, being not limited thereto, the terminal may be further include various elements according to functions to be performed. For example, the terminal may further include a display unit for displaying the current state of the terminal, an input unit for receiving a signal from the user executing a function, and a storage unit for storing data generated in the terminal. In FIG. 21, the channel estimator 2120 is described as being included in the controller 2110, but the present disclosure is not limited thereto. The controller 2110 may control the transceiver 2100 to receive configuration information for each of at least one RS resource from the BS. The controller 2110 receives at least one downlink control signal, determines continuity of the DMRS precoding directly or indirectly indicated, and controls the transceiver 2100 to perform DMRS channel estimation and data decoding accordingly. To indicate interruption of DMRS precoding continuation, the controller 2110 can directly or indirectly indicate the reset signal through the downlink control signal.

Figure 22:
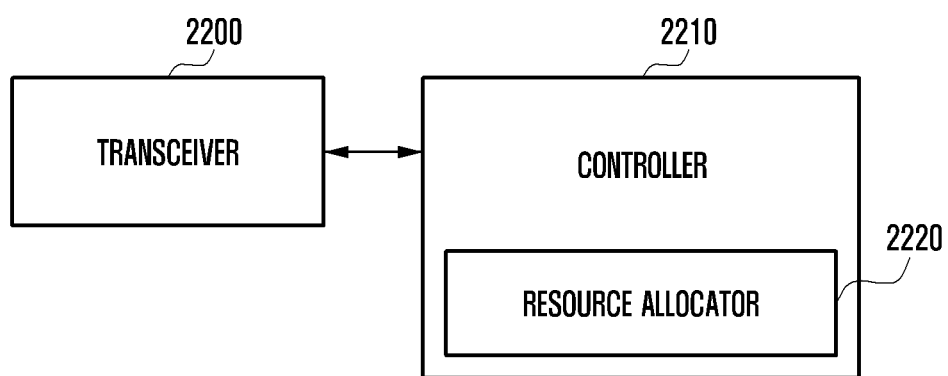
FIG. 22 is a block diagram of a BS according to an embodiment of the present disclosure.

FIG. 22 is a block diagram of a BS according to an embodiment of the present disclosure.

Referring to FIG. 22, the BS includes a controller 2210 and a transceiver 2200. The controller 2210 controls states and operations of all the components constituting the BS. Specifically, to enable the terminal to receive data, the controller 2210 allocates CSI-RS resources to the terminal for acquiring configurations for transmission technique information, DCI size information, and VRG information, and for channel estimation, and allocates feedback resources and timings to the terminal. To this end, the controller 2210 may include a resource allocator 2220. The transceiver 2200 transmits and receives data, RSs, and feedback information to and from the terminal. Here, the transceiver 2200 transmits the DMRS and data to the terminal through the allocated resources with or without application of the same precoding to the DMRS under the control of the controller 2210.

Referring to FIG. 22, the resource allocator 2220 is described as being included in the controller 2210, but the present disclosure is not limited thereto. The controller 2210 may control the transceiver 2200 to transmit configuration information to the terminal for each of at least one RS, or may generate at least one RS. The controller 2210 may control the transceiver 2200 to transmit the terminal transmission and DMRS configuration information necessary for data and DMRS transmission and feedback configuration information for generating feedback information according to measurement results. The controller 2210 may control the transceiver 2200 to transmit at least one downlink control signal to the terminal, and control the transceiver 2200 to transmit the data to which continuous or discontinuous precoding is applied at the data transmission timing indicated by the downlink control signal. In addition, the controller 2210 may transmit precoding reset information to the terminal, allowing the terminal to be aware that the corresponding precoding is not continuous.

Certain aspects of the present disclosure can also be embodied as computer readable code on a non-transitory computer readable recording medium. A non-transitory computer readable recording medium is any data storage device that can store data which can be thereafter read by a computer system. Examples of the non-transitory computer readable recording medium include a Read-Only Memory (ROM), a Random-Access Memory (RAM), Compact Disc-ROMs (CD-ROMs), magnetic tapes, floppy disks, and optical data storage devices. The non-transitory computer readable recording medium can also be distributed over network coupled computer systems so that the computer readable code is stored and executed in a distributed fashion. In addition, functional programs, code, and code segments for accomplishing the present disclosure can be easily construed by programmers skilled in the art to which the present disclosure pertains.

At this point it should be noted that the various embodiments of the present disclosure as described above typically involve the processing of input data and the generation of output data to some extent. This input data processing and output data generation may be implemented in hardware or software in combination with hardware. For example, specific electronic components may be employed in a mobile device or similar or related circuitry for implementing the functions associated with the various embodiments of the present disclosure as described above. Alternatively, one or more processors operating in accordance with stored instructions may implement the functions associated with the various embodiments of the present disclosure as described above. If such is the case, it is within the scope of the present disclosure that such instructions may be stored on one or more non-transitory processor readable mediums. Examples of the processor readable mediums include a ROM, a RAM, CD-ROMs, magnetic tapes, floppy disks, and optical data storage devices. The processor readable mediums can also be distributed over network coupled computer systems so that the instructions are stored and executed in a distributed fashion. In addition, functional computer programs, instructions, and instruction segments for accomplishing the present disclosure can be easily construed by programmers skilled in the art to which the present disclosure pertains.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method performed a terminal in a wireless communication system, the method comprising:
receiving, from a base station, configuration information on a physical resource block (PRB) bundling via higher layer signaling, the configuration information including first information indicating whether a precoding resource block group (PRG) size is indicated via downlink control information (DCI) or the PRG size is configured via the higher layer signaling and second information including one or more PRG size values among a set of PRG size values which includes 2, 4, and an allocated bandwidth for the terminal;
in case that the first information indicates that the PRG size is indicated via the DCI:
receiving, from the base station, the DCI including a PRG size indicator on a physical downlink control channel (PDCCH), wherein the PRG size indicator is set as a value corresponding to a PRG size value which is one of the one or more PRG size values, and
identifying the PRG size based on the PRG size indicator and the configuration information; and
in case that the first information indicates that the PRG size is configured via the higher layer signaling, identifying the PRG size based on the configuration information.

2. The method of claim 1, further comprising:
receiving demodulation reference signals (DMRSs) with downlink data,
wherein a channel state is estimated based on the DMRSs, to which the same precoding is applied based on the identified PRG size.

3. The method of claim 1, further comprising:
estimating a channel state based on an assumption that a same precoding is applied to PRBs based on the identified PRG size.

4. The method of claim 1,
wherein the configuration information is included in a first message, and
wherein the DCI is included in a second message, different from the first message.

5. A method performed by a base station in a wireless communication system, the method comprising:
transmitting, to a terminal, configuration information on a physical resource block (PRB) bundling via higher layer signaling, the configuration information including first information indicating whether a precoding resource block group (PRG) size is indicated via downlink control information (DCI) or the PRG size is configured via the higher layer signaling and second information including one or more PRG size values among a set of PRG size values which includes 2, 4, and an allocated bandwidth for the terminal;
in case that the first information indicates that the PRG size is indicated via the DCI:
transmitting, to the terminal, the DCI including a PRG size indicator on a physical downlink control channel (PDCCH), wherein the PRG size indicator is set as a value corresponding to a PRG size value which is one of the one or more PRG size values, and
transmitting, to the terminal, downlink data based on the PRG size corresponding to the PRG size indicator; and
in case that the first information indicates that the PRG size is configured via the higher layer signaling, transmitting the downlink data based on the PRG size configured based on the configuration information.

6. The method of claim 5, further comprising:
transmitting demodulation reference signals (DMRSs) with the downlink data,
wherein a channel state is estimated based on the DMRSs, to which the same precoding is applied based on the PRG size.

7. The method of claim 5, wherein a channel state is estimated based on an assumption that a same precoding is applied to PRBs based on the PRG size.

8. The method of claim 5,
wherein the configuration information is included in a first message, and
wherein the DCI is included in a second message, different from the first message.

9. A terminal in a wireless communication system, the terminal comprising:
a transceiver; and
a controller coupled with the transceiver and configured to:
receive, from a base station, configuration information on a physical resource block (PRB) bundling via higher layer signaling, the configuration information including first information indicating whether a precoding resource block group (PRG) size is indicated via downlink control information (DCI) or the PRG size is configured via the higher layer signaling and second information including one or more PRG size values among a set of PRG size values which includes 2, 4, and an allocated bandwidth for the terminal,
in case that the first information indicates that the PRG size is indicated via the DCI:
receive, from the base station, the DCI including a PRG size indicator on a physical downlink control channel (PDCCH), wherein the PRG size indicator is set as a value corresponding to a PRG size value which is one of the one or more PRG size values, and
identify the PRG size based on the PRG size indicator and the configuration information, and
in case that the first information indicates that the PRG size is configured via the higher layer signaling, identify the PRG size based on the configuration information.

10. The terminal of claim 9,
wherein the controller is further configured to receive demodulation reference signals (DMRSs) with downlink data, and
wherein a channel state is estimated based on the DMRSs, to which the same precoding is applied based on the identified PRG size.

11. The terminal of claim 9, wherein the controller is further configured to estimate a channel state based on an assumption that a same precoding is applied to PRBs based on the identified PRG size.

12. The terminal of claim 9,
wherein the configuration information is included in a first message, and wherein the DCI is included in a second message, different from the first message.

13. A base station in a wireless communication system, the base station comprising:
a transceiver; and
a controller coupled with the transceiver and configured to:
- transmit, to a terminal, configuration information on a physical resource block (PRB) bundling via higher layer signaling, the configuration information including first information indicating whether a precoding resource block group (PRG) size is indicated via downlink control information (DCI) or the PRG size is configured via the higher layer signaling and second information including one or more PRG size values among a set of PRG size values which includes 2, 4, and an allocated bandwidth for the terminal,
- in case that the first information indicates that the PRG size is indicated via the DCI:
  - transmit, to the terminal, the DCI including a PRG size indicator on a physical downlink control channel (PDCCH), wherein the PRG size indicator is set as a value corresponding to a PRG size value which is one of the one or more PRG size values, and
  - transmit, to the terminal, downlink data based on the PRG size corresponding to the PRG size indicator, and
- in case that the third first information indicates that the PRG size is configured via the higher layer signaling, transmit the downlink data based on the PRG size configured based on the configuration information.

14. The base station of claim 13,
wherein the controller is further configured to transmit demodulation reference signals (DMRSs) with the downlink data, and
wherein a channel state is estimated based on the DMRSs, to which the same precoding is applied based on the PRG size.

15. The base station of claim 13, wherein a channel state is estimated based on an assumption that a same precoding is applied to PRBs based on the PRG size.

16. The base station of claim 13,
wherein the configuration information is included in a first message, and
wherein the DCI is included in a second message, different from the first message.

* * * * *